United States Patent
Sakhnini et al.

(10) Patent No.: US 12,009,959 B1
(45) Date of Patent: Jun. 11, 2024

(54) TECHNIQUES FOR MANAGING PEAK-TO-AVERAGE POWER RATIO

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/156,233

(22) Filed: Jan. 18, 2023

(51) Int. Cl.
*H04L 25/02* (2006.01)
*H04L 5/00* (2006.01)
*H04L 27/26* (2006.01)

(52) U.S. Cl.
CPC ...... H04L 27/2617 (2013.01); H04L 27/2697 (2013.01)

(58) Field of Classification Search
CPC .......... H04L 27/2617; H04L 27/2697
USPC ........................................... 375/260
See application file for complete search history.

(56) References Cited

U.S. PATENT DOCUMENTS

| | | | | |
|---|---|---|---|---|
| 8,385,439 | B2 * | 2/2013 | Djordjevic | H04L 1/0631 398/202 |
| 2005/0220200 | A1 * | 10/2005 | Giannakis | H04L 5/023 375/260 |
| 2020/0374054 | A1 * | 11/2020 | Shattil | H04J 99/00 |

\* cited by examiner

*Primary Examiner* — Tanmay K Shah
(74) *Attorney, Agent, or Firm* — Holland & Hart LLP

(57) ABSTRACT

Methods, systems, and devices for wireless communications are described. Techniques described herein provide for managing peak-to-average power ratio (PAPR) using an index modulation scheme. A first communication device may generate a set of information bits to convey to a second communication device via the index modulation scheme. A set of extra information bits may be generated using a linear coding scheme, and the set of extra information bits may be inserted into the set of information bits. The first communication device may encode the set of information bits with the inserted extra, and the first communication device may transmit, to the second communication device, a signal including the encoded set of information bits.

30 Claims, 19 Drawing Sheets

First Interleaved Version Part-One 710-a   11 00 10 11 11 00 01 10

Second Interleaved Version Part-One 710-b   11 00 10 11 11 00 01 10

First Interleaved Version

| Part-One 710-a | 11 | 00 | 10 | 11 | 11 | 00 | 01 | 10 |
|---|---|---|---|---|---|---|---|---|
| Part-Two Group A 715-a | | 10 | | | | 11 | | |
| Part-Two Group B 720-a | | | | | | | 10 | |
| Part-Two Group C 725-a | | | 01 | | | | | 11 |
| Part-Two Group D 730-a | 00 | | | 10 | 00 | | | |

Second Interleaved Version

| Part-One 710-b | 01 | 11 | 10 | 01 | 00 | 10 | 11 | 11 |
|---|---|---|---|---|---|---|---|---|
| Part-Two Group A 715-b | | | | | 00 | | | |
| Part-Two Group B 720-b | 00 | | | 10 | | | | |
| Part-Two Group C 725-b | | | 01 | | | 11 | | |
| Part-Two Group D 730-b | | 10 | | | | | 10 | 11 |

700

TECHNIQUES FOR MANAGING PEAK-TO-AVERAGE POWER RATIO

FIELD OF TECHNOLOGY

The present disclosure relates to wireless communications, including techniques for managing peak-to-average power ratio (PAPR).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for managing PAPR. For example, the described techniques provide for reducing PAPR using an index modulation scheme. A first communication device (e.g., a UE, a base station, or a network node) may generate a set of information bits to convey to a second communication device (e.g., a UE, a base station, or a network node) via the index modulation scheme. A set of extra information bits may be generated using a linear coding scheme, and the set of extra information bits may be inserted into the set of information bits. The first communication device may encode the set of information bits with the inserted extra bits and may transmit, to the second communication device, a signal including the encoded set of information bits.

A method for wireless communication at a first device is described. The method may include generating a set of information bits to convey to a second device via an index modulation scheme, the set of information bits including a first subset of information bits and a second subset of information bits, generating a third subset of information bits based on a linear coding scheme, inserting the third subset of information bits within the first subset of information bits or the second subset of information bits, encoding the set of information bits based on the inserting, and transmitting, to the second device, a signal including the encoded set of information bits.

An apparatus for wireless communication at a first device is described. The apparatus may include a processor, memory coupled with the processor, and instructions stored in the memory. The instructions may be executable by the processor to cause the apparatus to generate a set of information bits to convey to a second device via an index modulation scheme, the set of information bits including a first subset of information bits and a second subset of information bits, generate a third subset of information bits based on a linear coding scheme, insert the third subset of information bits within the first subset of information bits or the second subset of information bits, encode the set of information bits based on the inserting, and transmit, to the second device, a signal including the encoded set of information bits.

Another apparatus for wireless communication at a first device is described. The apparatus may include means for generating a set of information bits to convey to a second device via an index modulation scheme, the set of information bits including a first subset of information bits and a second subset of information bits, means for generating a third subset of information bits based on a linear coding scheme, means for inserting the third subset of information bits within the first subset of information bits or the second subset of information bits, means for encoding the set of information bits based on the inserting, and means for transmitting, to the second device, a signal including the encoded set of information bits.

A non-transitory computer-readable medium storing code for wireless communication at a first device is described. The code may include instructions executable by a processor to generate a set of information bits to convey to a second device via an index modulation scheme, the set of information bits including a first subset of information bits and a second subset of information bits, generate a third subset of information bits based on a linear coding scheme, insert the third subset of information bits within the first subset of information bits or the second subset of information bits, encode the set of information bits based on the inserting, and transmit, to the second device, a signal including the encoded set of information bits.

Some examples of the method, apparatuses, and non-transitory computer-readable medium described herein may further include operations, features, means, or instructions for selecting a first group of information bits and a second group of information bits from a set of multiple groups of information bits, where the second subset of information bits includes the first group of information bits and the second group of information bits and where inserting the third subset of bits includes: inserting the third subset of information bits within the first group of information bits or the second group of information bits.

Some examples of the method, apparatuses, and non-transitory computer-readable medium described herein may further include operations, features, means, or instructions for transmitting, to the second device, an indication of the first group of information bits, including the third subset of information bits or the second group of information bits including the third subset of information bits, based on the inserting.

In some examples of the method, apparatuses, and non-transitory computer-readable medium described herein, inserting the third subset of information bits within the first group of information bits or the second group of information bits may include operations, features, means, or instructions for inserting the third subset of information bits within the first group of information bits or the second group of information bits based at least on a peak-to-average power associated with the encoded set of information bits.

Some examples of the method, apparatuses, and non-transitory computer-readable medium described herein may further include operations, features, means, or instructions for determining a quantity of groups of information bits based at least on a quantity of information bits of the third subset of information bits and where inserting the third subset of information bits includes inserting the third subset of information bits within at least one of the quantity of groups of information bits.

Some examples of the method, apparatuses, and non-transitory computer-readable medium described herein may further include operations, features, means, or instructions for transmitting, to the second device, an indication of the at least one of the quantity of groups of information bits including the third subset of information bits.

In some examples of the method, apparatuses, and non-transitory computer-readable medium described herein, inserting the third subset of information bits within the at least one of the quantity of groups of information bits may include operations, features, means, or instructions for inserting the third subset of information bits within the at least one of the quantity of groups of information bits based at least on a peak-to-average power associated with the encoded set of information bits.

In some examples of the method, apparatuses, and non-transitory computer-readable medium described herein, inserting the third subset of information bits may include operations, features, means, or instructions for inserting the third subset of information bits within at least one group of a set of multiple groups of information bits and inserting a set of forced bits within the first subset of information bits for indicating one or more locations of the third subset of information bits.

Some examples of the method, apparatuses, and non-transitory computer-readable medium described herein may further include operations, features, means, or instructions for transmitting, to the second device, an indication of the set of forced bits.

Some examples of the method, apparatuses, and non-transitory computer-readable medium described herein may further include operations, features, means, or instructions for interleaving the first subset of information bits using a first interleaving scheme to generate a first interleaved subset of information bits, interleaving the first subset of information bits using a second interleaving scheme to generate a second interleaved first subset of information bits, selecting the first interleaved first subset of information bits or the second interleaved first subset of information bits based at least on a peak-to-average power associated with the encoded set of information bits, and where encoding the set of information bits may be based on the selecting.

In some examples of the method, apparatuses, and non-transitory computer-readable medium described herein, the index modulation scheme includes a multi-mode orthogonal frequency divisional multiplexing index modulation (MM-OFDM-IM) scheme.

In some examples of the method, apparatuses, and non-transitory computer-readable medium described herein, the third subset of information bits includes one or more bits of the first subset of information bits or the second subset of information bits.

In some examples of the method, apparatuses, and non-transitory computer-readable medium described herein, the signal includes a MM-OFDM-IM scheme waveform.

In some examples of the method, apparatuses, and non-transitory computer-readable medium described herein, the first device includes a user equipment and the second device includes a network node.

In some examples of the method, apparatuses, and non-transitory computer-readable medium described herein, the first device includes a network node and the second device includes a user equipment.

In some examples of the method, apparatuses, and non-transitory computer-readable medium described herein, the first device includes a first user equipment and the second device includes a second user equipment.

A method for wireless communication at a second device is described. The method may include receiving, from a first device, a signal, determining a sequence associated with the signal, decoding the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence, and discarding the third subset of information bits based on the decoding.

An apparatus for wireless communication at a second device is described. The apparatus may include a processor, memory coupled with the processor, and instructions stored in the memory. The instructions may be executable by the processor to cause the apparatus to receive, from a first device, a signal, determine a sequence associated with the signal, decode the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence, and discard the third subset of information bits based on the decoding.

Another apparatus for wireless communication at a second device is described. The apparatus may include means for receiving, from a first device, a signal, means for determining a sequence associated with the signal, means for decoding the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence, and means for discarding the third subset of information bits based on the decoding.

A non-transitory computer-readable medium storing code for wireless communication at a second device is described. The code may include instructions executable by a processor to receive, from a first device, a signal, determine a sequence associated with the signal, decode the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence, and discard the third subset of information bits based on the decoding.

In some examples of the method, apparatuses, and non-transitory computer-readable medium described herein, decoding the sequence may include operations, features, means, or instructions for identifying a first group of information bits of the second subset of information bits and a second group of information bits of the second subset of information bits.

Some examples of the method, apparatuses, and non-transitory computer-readable medium described herein may further include operations, features, means, or instructions for receiving, from the first device, an indication of the first group of information bits including the third subset of information bits or the second group of information bits including the third subset of information bits and identifying the third subset of information bits based on the indication.

In some examples of the method, apparatuses, and non-transitory computer-readable medium described herein, decoding the sequence may include operations, features, means, or instructions for identifying a quantity of groups of information bits of the second subset of information bits.

Some examples of the method, apparatuses, and non-transitory computer-readable medium described herein may further include operations, features, means, or instructions for receiving, from the first device, an indication of a group of the quantity of groups of information bits including the third subset of information bits and identifying the third subset of information bits based on the indication.

Some examples of the method, apparatuses, and non-transitory computer-readable medium described herein may further include operations, features, means, or instructions for receiving, from the first device, an indication of a set of forced bits within the first subset of information bits and identifying the third subset of information bits based on the indication.

In some examples of the method, apparatuses, and non-transitory computer-readable medium described herein, the signal includes a MM-OFDM-IM scheme waveform.

In some examples of the method, apparatuses, and non-transitory computer-readable medium described herein, the index demodulation scheme includes a MM-OFDM-IM modulation scheme.

In some examples of the method, apparatuses, and non-transitory computer-readable medium described herein, the first device includes a user equipment and the second device includes a network node.

In some examples of the method, apparatuses, and non-transitory computer-readable medium described herein, the first device includes a network node and the second device includes a user equipment.

In some examples of the method, apparatuses, and non-transitory computer-readable medium described herein, the first device includes a first user equipment and the second device includes a second user equipment.

DETAILED DESCRIPTION

Figure 1:
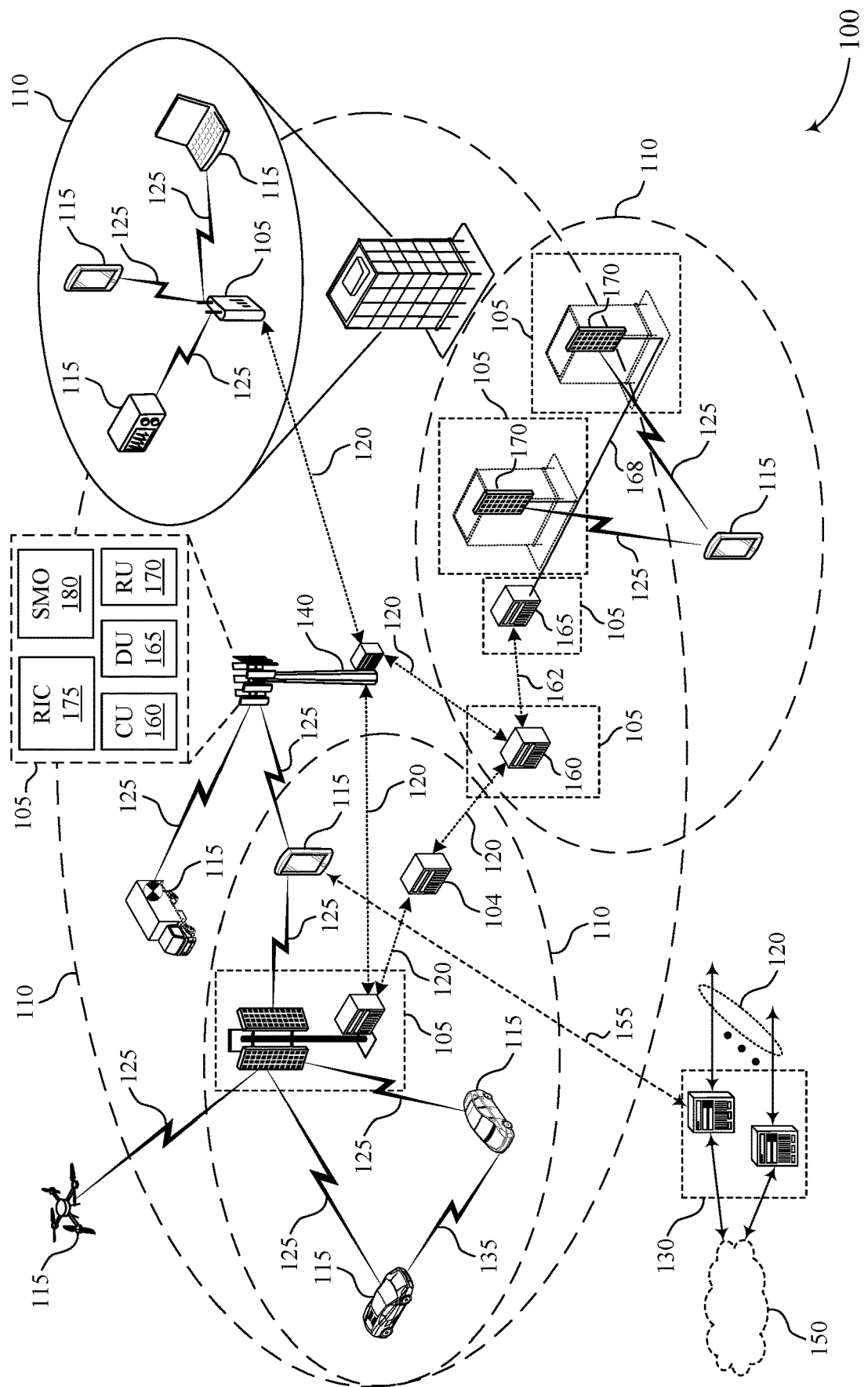
FIGS. 1 and 2 illustrate examples of wireless communications systems that support techniques for managing PAPR in accordance with one or more aspects of the present disclosure.

Some wireless communications systems may use an orthogonal frequency division multiplexing (OFDM) waveform. In some cases, the OFDM waveform may exhibit high peak-to-average-power ratio (PAPR) based on the superposition of different signals in one or more subcarriers (SCs). PAPR is a ratio of peak power to the average power of the waveform. A high PAPR may decrease the efficiency of a power amplifier amplifying the waveform. A high PAPR may also cause the power amplifier to operate non-linearly. Accordingly, managing the PAPR may be beneficial. One method to reduce the PAPR may be adding extra bits or symbols generated with linear block codes (LBC) to a sequence. However, these extra bits or symbols may reduce spectral efficiency. Another method to reduce the PAPR may be interleaving the sequence to reorder the information bits of the sequence. However, interleaving may increase the overhead and may reduce spectral efficiency because the interleaving scheme is indicated to a receiver.

Various aspects of the present disclosure relate to enabling a communication device to support an index modulation scheme for managing PAPR. For example, a first communication device (such as, a UE, a base station, or a network node) may generate a set of information bits to convey to a second communication device (such as, a UE, a base station, or a network node) via a multi-mode OFDM index modulation (MM-OFDM-IM) scheme waveform. The set of information bits may include a first subset of information bits and a second subset of information bits. The first communication device may generate a third subset of information bits using LBC, and the third subset of information bits may be inserted within the first subset of information bits or the second subset of information bits. The first communication device may encode the set of information bits including the inserted third subset of information bits, and the first communication device may transmit, to the second communication device, a signal including the encoded set of information bits.

Additionally, the second communication device (such as, a UE, a base station, or a network node) may receive, from the first communication device (such as, a UE, a base station, or a network node), the signal, and the second communication device may identify a sequence associated with the signal. The second communication device may decode the sequence using an index demodulation scheme to identify the first subset of information bits, the second subset of information bits and the third subset of information bits. The third subset of information bit may be discarded.

In some examples, the second subset of information bits may include several groups, and the third subset of information bits may be inserted in one of the groups. The group selected for the third subset of information bits may be based on the PAPR associated with the encoded set of information bits. The first communication device may indicate, to the second communication device, the group with the third subset of information bits. The quantity of groups for the second subset of information bits may be selected based on the quantity of third subset of information bits. In some examples, the third subset of information bits may be inserted at certain positions, such as every Nth data bits, and the first subset of information bits may include a set of forced bits within the first subset of information bits for indicating the positions of the third subset of information bits. The first communication device may indicate, to the second communication device, the forced bits, and the second communication device may discard the forced bits. In some examples, the first communication device may interleave the first subset of information bits using a first interleaving scheme and a second interleaving scheme to generate different interleaved versions, and the first communication device may select one of the interleaved versions for transmission based on the PAPR associated with the encoded information bits.

Aspects of the disclosure are initially described in the context of wireless communications systems. Additional aspects of the disclosure are described in the context of a wireless communications system, examples of index modulation schemes, an example transmitter diagram, and an example process flow. Aspects of the disclosure are further illustrated by and described with reference to apparatus diagrams, system diagrams, and flowcharts that relate to techniques for managing PAPR.

FIG. 1 illustrates an example of a wireless communications system 100 that supports techniques for managing PAPR in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network node 105 (also referred to as a network entity) may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network node 105 may support a coverage area 110 (e.g., a geographic coverage area) over which the UEs 115 and the network node 105 may establish one or more communication links 125. The coverage area 110 may be an example of a geographic area over which a network node 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network node 105 (e.g., any network node described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network node 105. As another example, a first node may be configured to communicate with a second node or a third node. In one aspect of this example, the first node may be a UE 115, the second node may be a network node 105, and the third node may be a UE 115. In another aspect of this example, the first node may be a UE 115, the second node may be a network node 105, and the third node may be a network node 105. In yet other aspects of this example, the first, second, and third nodes may be different relative to these examples. Similarly, reference to a UE 115, network node 105, apparatus, device, computing system, or the like may include disclosure of the UE 115, network node 105, apparatus, device, computing system, or the like being a node. For example, disclosure that a UE 115 is configured to receive information from a network node 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node 105 (e.g., a base station 140) may be implemented in an aggregated (e.g., monolithic, standalone) base station architecture, which may be configured to utilize a protocol stack that is physically or logically integrated within a single network node 105 (e.g., a single RAN node, such as a base station 140).

In some examples, a network node 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network node 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network node 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for managing PAPR as described herein. For example, some operations described as being performed by a UE 115 or a network node 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network node 105 and other devices may refer to communication between the devices and any portion (e.g., entity, sub-entity) of a network node 105. For example, the terms "transmitting," "receiving," or "communicating," when referring to a network node 105, may refer to any portion of a network node 105 (e.g., a base station 140, a CU 160, a DU 165, a RU 170) of a RAN communicating with another device (e.g., directly or via one or more other network entities 105).

Signal waveforms transmitted via a carrier may be made up of multiple SCs (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one SC, in which case the symbol period and subcarrier spacing (SCS) may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported SCS, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on SCS. Each slot may include a quantity of symbol periods (e.g., depending on the length of the cyclic prefix prepended to each symbol period). In the wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network node 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network node 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network node 105 (e.g., a base station 140, an RU 170), which may support aspects of such D2D communications being configured by (e.g., scheduled by) the network node 105. In some examples, one or more UEs 115 of such a group may be outside the coverage area 110 of a network node 105 or may be otherwise unable to or not configured to receive transmissions from a network node 105. In some examples, groups of the UEs 115 communicating via D2D communications may support a one-to-many (1:M) system in which each UE 115 transmits to each of the other UEs 115 in the group. In some examples, a network node 105 may facilitate the scheduling of resources for D2D communications. In some other examples, D2D communications may be carried out between the UEs 115 without an involvement of a network node 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network node 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network node 105 may be located at diverse geographic locations. A network node 105 may include an antenna array with a set of rows and columns of antenna ports that the network node 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In the wireless communications system 100, one or more network entities 105 (e.g., base stations 140) and UEs 115 may be configured to support an index modulation scheme for managing PAPR in the wireless communications system 100. For example, a first communication device (e.g., a network node 105, a UE 115, or a base station 140) may generate a set of information bits to convey to a second communication device (e.g., a network node 105, a UE 115, or a base station 140) via a multi-mode MM-OFDM-IM scheme waveform. The set of information bits may include a first subset of information bits and a second subset of information bits. The first communication device (e.g., a network node 105, a UE 115, or a base station 140) may generate a third subset of information bits using LBC, and the third subset of information bits may be inserted within the first subset of information bits or the second subset of information bits. The first communication device (e.g., a network node 105, a UE 115, or a base station 140) may encode the set of information bits including the inserted third subset of information bits, and the first communication device may transmit, to the second communication device (e.g., a network node 105, a UE 115, or a base station 140), a signal including the encoded set of information bits.

The second communication device (e.g., a network node 105, a UE 115, or a base station 140) may receive, from the first communication device (e.g., a network node 105, a UE 115, or a base station 140), the signal, and the second communication device may identify a sequence associated with the signal. The second communication device may decode the sequence using an index demodulation scheme to identify the first subset of information bits, the second subset of information bits and the third subset of information bits. The third subset of information bit may be discarded.

In some examples, the second subset of information bits may include several groups, and the third subset of information bits may be inserted in one of the groups. The group selected for the third subset of information bits may be based on the PAPR associated with the encoded set of information bits. The first communication device (e.g., a network node 105, a UE 115, or a base station 140) may indicate, to the second communication device (e.g., a network node 105, a UE 115, or a base station 140), the group with the third subset of information bits. The quantity of groups for the second subset of information bits may be selected based on the quantity of third subset of information bits. In some examples, the third subset of information bits may be placed at specific locations, such as every Nth data bits, and the first subset of information bits may include a set of forced bits within the first subset of information bits for indicating the locations of the third subset of information bits.

The first communication device (e.g., a network node 105, a UE 115, or a base station 140) may indicate, to the second communication device (e.g., a network node 105, a UE 115, or a base station 140), the forced bits, and the second communication device may discard the forced bits. In some examples, the first communication device may interleave the first subset of information bits using a first interleaving scheme and a second interleaving scheme to generate different interleaved versions, and the first communication device may select one of the interleaved versions for transmission based on the PAPR associated with the encoded information bits.

Figure 2:
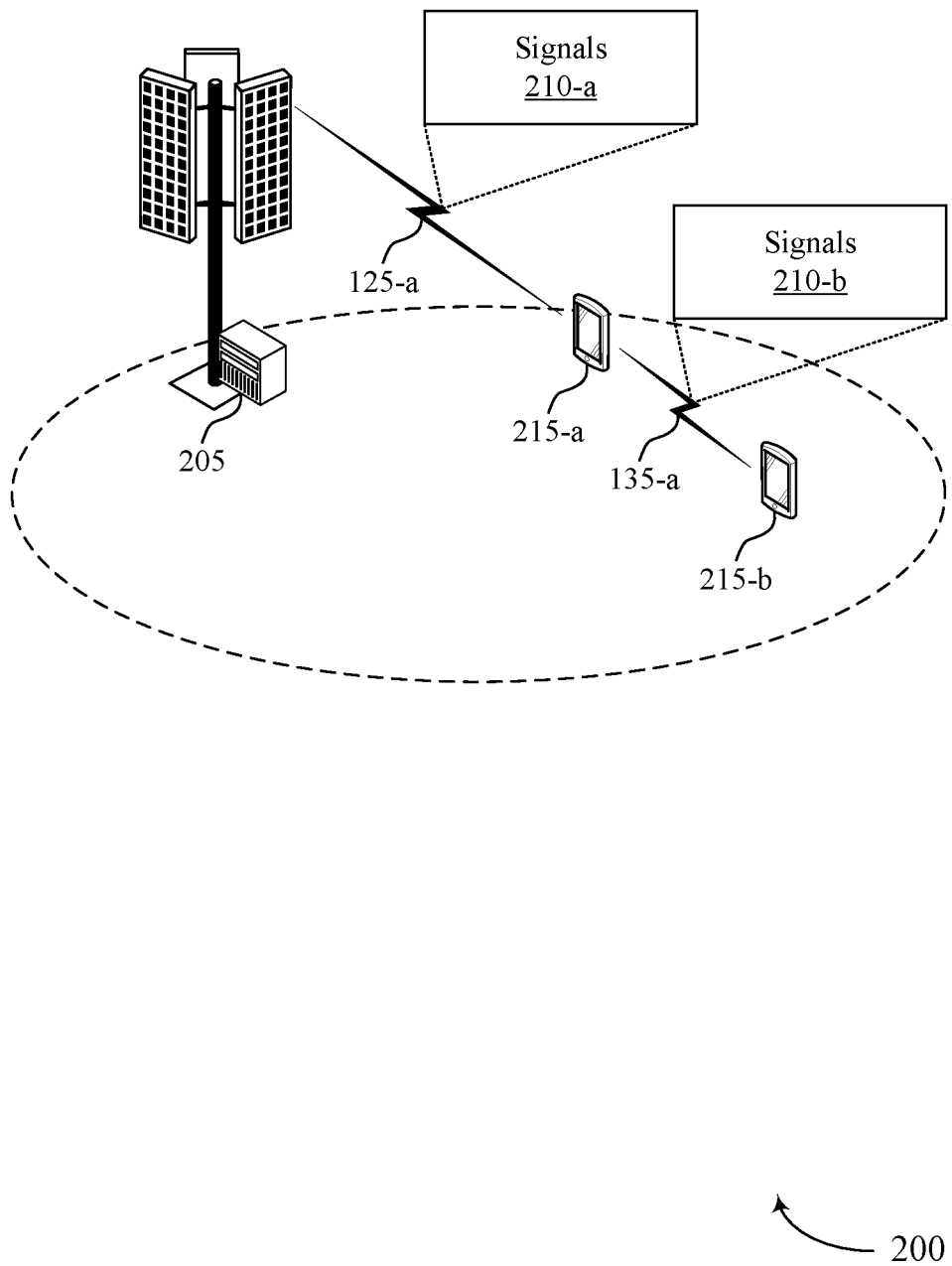

FIG. 2 illustrates an example of a wireless communications system 200 that supports techniques for managing PAPR in accordance with one or more aspects of the present disclosure. The wireless communications system 200 may implement aspects of the wireless communications system 100. For example, the wireless communications system may include a first communication device 205, which may be an example of a network node 105 or a base station 140 described with reference to FIG. 1. The wireless communications system may include a second communication device 215-a and a third communication device 215-b, which may be examples of UEs 115 described with reference to FIG. 1.

The first communication device 205 may communicate with the second communication device 215-a via a communication link 125-a, and the second communication device 215-a may communicate with the third communication device 215-b via a communication link 135-a. The communication link 125-a may be an example of the communication link 125, and the communication link 135-a may be an example of the communication link 135, described in reference to FIG. 1. The first communication device 205 may transmit a signal 210-a to the second communication device 215-a via the communication link 125-a. The second communication device 215-a may transmit a signal 210-a to the first communication device 205 via the communication link 125-a. The second communication device 215-a may transmit a signal 210-b to the third communication device 215-b via the communication link 135-a. The third communication device 215-b may transmit a signal 210-b to the second communication device 215-a via the communication link 135-a.

In the example of FIG. 2, the first communication device 205, the second communication device 215-a, and the third communication device 215-b may be configured to support wireless communications using an index modulation scheme. For example, the first communication device 205, the second communication device 215-a, and the third communication device 215-b may convey information bits using the index modulation scheme. As part of index modulation, the first communication device 205, the second communication device 215-a, and the third communication device 215-b may generate a bit sequence (also referred to as a bitstream) including a set of information bits, which may be divided (e.g., segmented, split, grouped) into two subset of information bits, a first subset of information bits and a second subset of information bits. For the following description, the first subset of information bits will be referred to as part-one bits and the second subset of information bits will be referred to as part-two bits.

The first communication device 205, the second communication device 215-a, and the third communication device 215-b may convey the part-one bits using source-based index modulation. In some examples, the part-one bits may be conveyed implicitly by the index usage or activation patterns of SCs using frequency domain index modulation. In some other examples, the part-one bits may be conveyed implicitly by the index usage or activation patterns of antennas via spatial domain index modulation (also referred to as spatial modulation). In other examples, the part-one bits may be conveyed implicitly by the index usage or activation patterns of time slots via time domain index modulation. In some other examples, the first communication device 205, the second communication device 215-*a*, and the third communication device 215-*b* may convey the part-one bits using media-based index modulation. For example, the part-one bits may be conveyed implicitly by the index usage or activation patterns of channels states via channel domain index modulation.

The first communication device 205, the second communication device 215-*a*, and the third communication device 215-*b* may convey the part-two bits by modulating the part-two bits using a modulation and coding scheme. For example, the part-two bits may be modulated using an amplitude and phase modulation and coding schemes, among other examples (e.g., any other means of orthogonality). In some examples, a subset of resources, for example, SCs, antennas, time slots or channel states, may be used for conveying the information bits. The other subset of resources may be unused for the associated transmission. Additional information bits may be conveyed implicitly by the index usage or activation patterns. In some examples, the index modulation may provide increased spectral efficiency and increase energy efficiency.

Figure 3:
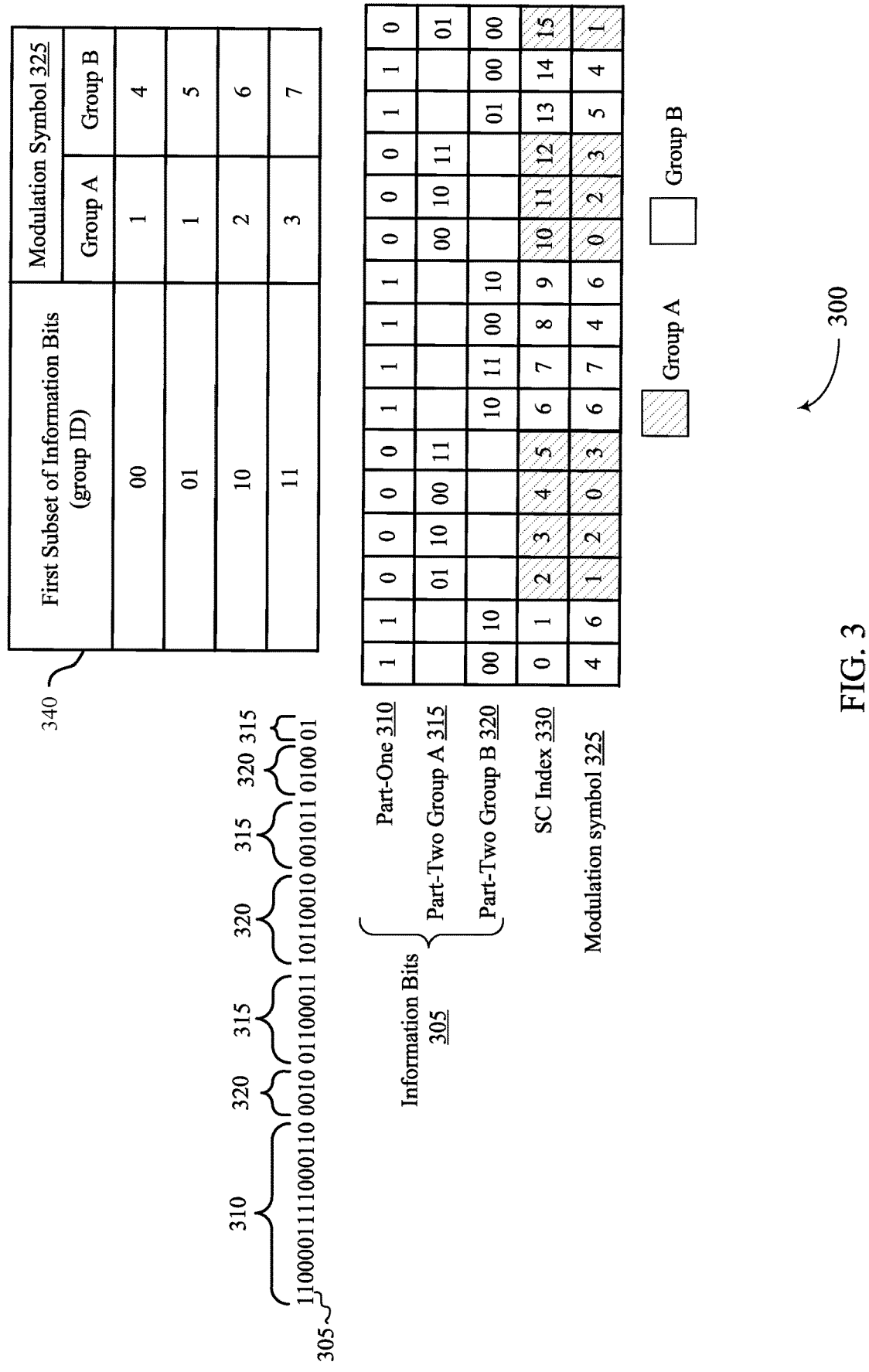
FIGS. 3 and 4 illustrate examples of index modulation schemes that support techniques for managing PAPR in accordance with one or more aspects of the present disclosure.

FIG. 3 illustrates an example of an index modulation scheme 300 that supports techniques for managing PAPR in accordance with one or more aspects of the present disclosure. In some examples, the index modulation scheme 300 may implement aspects of the wireless communications system 100 and the wireless communications system 200 as described in FIGS. 1 and 2, respectively. For example, the index modulation scheme 300 may be an MM-OFDM-IM scheme without sub-block partition.

A communication device, such as a network node 105, a UE 115, a base station 140, or a combination thereof may convey a set of information bits 305. The set of information bits 305 may be split into a first subset of information bits (e.g., part-one bits 310) and a second subset of information bits (e.g., part-two bits). The part-two bits may be split into G groups, such as part-two group A bits 315 and part-two group B bits 320. For the following description, the first subset of information bits will be referred to as part-one bits 310, and the second subset of information bits will be referred to as part-two bits. OFDM SCs may carry modulation symbols 325 belonging to one of G groups, such as the two groups of group A and group B. Each group may be 1 of S possible distinguishable or orthogonal modulation symbols, and each group may be a size $\log_2(S)$ bits.

The part-one bits 310 may be used to determine the part-two group, such as 1 indicating the part-two group A bits 315 and 0 indicating the part-two group B bits 320. The number of part-one bits may be p1=$\log_2(G)$ bits per SC. The part-two bits may be used to determine the modulation symbols 325 within the group. The number of part-two bits may be p2=$\log_2(S)$ bits per SC. For L SCs, the total number of bits carried may be m=L×($\log_2(G)+\log_2(S)$). A lookup table 340 may be used to determine the mapping between group G and modulations symbols 325. For the example illustrated in FIG. 3, the number of SCs L is 16 as shown with the SC index 330, the number of modulation symbols S per group is 4, and the number of groups G is 2. The number of the part-one bits 310 is 16 bits, the number of part-two group A bits 315 is 16 bits and the number of part-two group B bits 320 is 16 bits.

Figure 4:
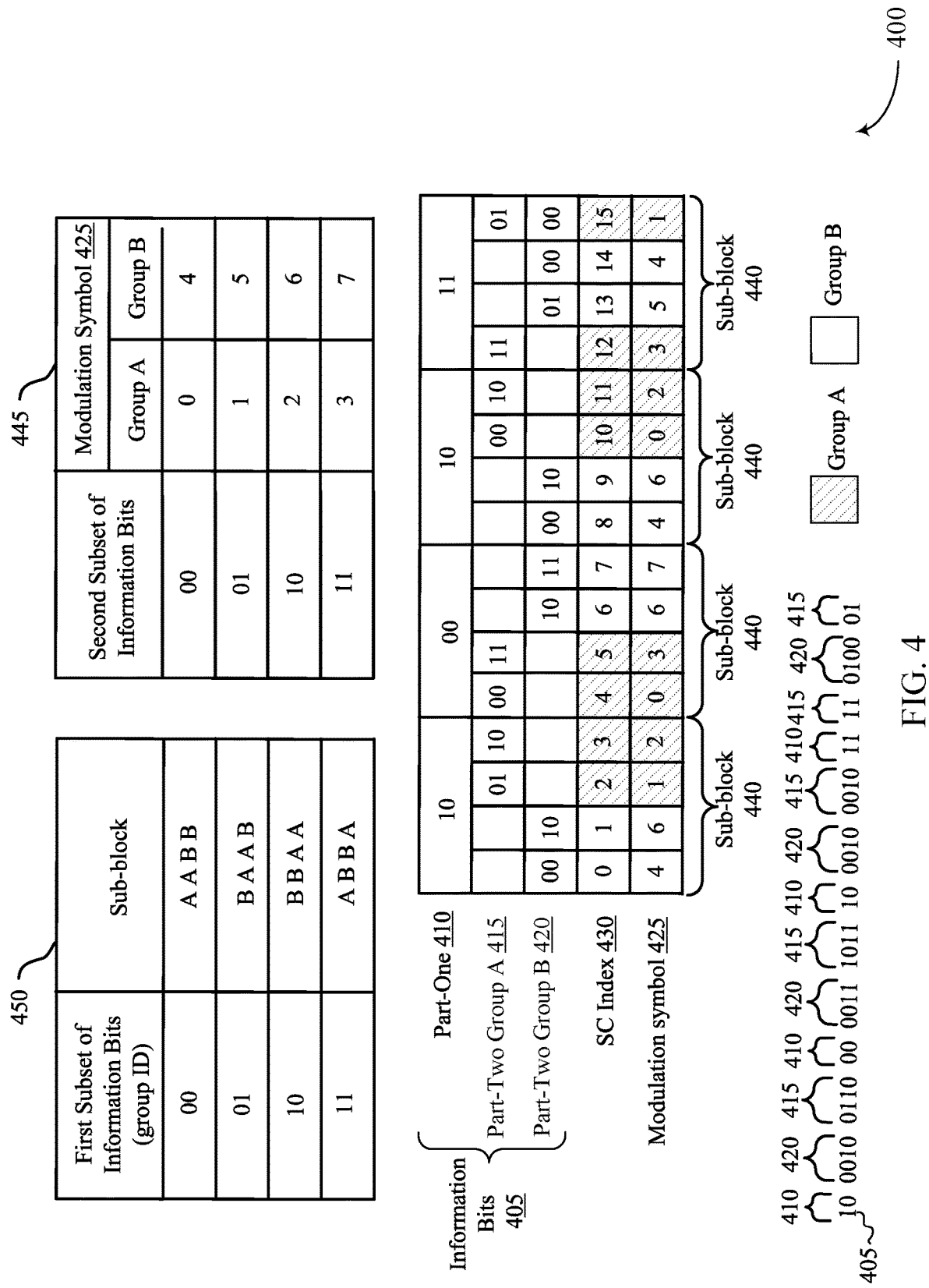

FIG. 4 illustrates an example of an index modulation scheme 400 that supports techniques for managing PAPR in accordance with one or more aspects of the present disclosure. In some examples, the index modulation scheme 400 may implement aspects of the wireless communications system 100 and the wireless communications system 200 as described in FIGS. 1 and 2, respectively. For example, the index modulation scheme 400 may be a MM-OFDM-IM scheme with sub-block partition.

A communication device, such as a network node 105, a UE 115, a base station 140, or a combination thereof may convey a set of information bits 405. The set of information bits 405 may be split into a first subset of information bits (e.g., part-one bits 410) and a second subset of information bits (e.g., part-two bits). The part-two bits may be split into G groups, such as part-two group A bits 415 and part-two group B bits 420. For the following description, the first subset of information bits will be referred to as part-one bits 410, and the second subset of information bits will be referred to as part-two bits. OFDM SCs may carry modulation symbols 425 belonging to one of G groups, such as the two groups of group A and group B. Each group may be 1 of S possible distinguishable or orthogonal modulation symbols, and each group may be a size $\log_2(S)$ bits.

For the sub-block partition, the L SCs may be partitioned into B sub-blocks 440 with each having length $L_{SB}$. The G orthogonal groups (e.g., group A and group B) may be located within each sub-block 440. The part-one bits 410 may be used to determine the part-two group (e.g., group A and group B) in each sub-block 440. The number of part-one of bits may be $p1=\log_2 \prod_{b=0}^{B} \binom{L_{SB}-\sum_{j=0}^{b-1} k_j}{k_b}$. where $k_j$ is the number of SCs in group j. The part-two bits may be used to determine the modulation symbol within the group. The number of part-two bits may be $$p2 = \sum_{i=0}^{G-1} k_i \log_2(S_i)$$

For B sub-blocks, the total number of bits carried may be $$m = B \times \left( \left\lfloor \log_2 \prod_{b=0}^{B} \binom{L_{SB}-\sum_{j=0}^{b-1} k_j}{k_b} \right\rfloor + \sum_{i=0}^{G-1} k_i \log_2(S_i) \right).$$

A lookup table 445 may be used to determine the mapping between group G and modulations symbols 425. A lookup table 450 may be used to determine the mapping between part-one bits 410 and the sub-block 440. For the example illustrated in FIG. 4, the number of SCs L is 16 as shown with the SC index 430, the number of modulation symbols S is 4, the number of groups G is 2, the number of sub-blocks B is 4, the number of SCs in group A $k_1$ and group B $k_2$ is 2. The number of part-one bits 410 is 8 bits, the number of part-two group A bits 415 is 16 bits and the number of part-two group B bits 420 is 16 bits.

Figure 5A:
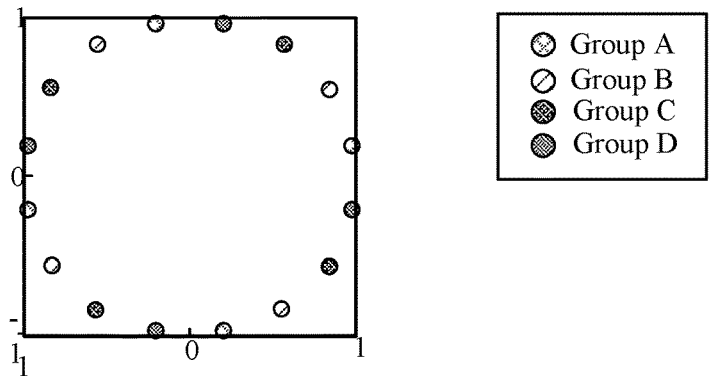
FIGS. 5A through 5C illustrate examples of block diagrams of a constellation and transmitters that support techniques for managing PAPR in accordance with one or more aspects of the present disclosure.
Figure 5B:
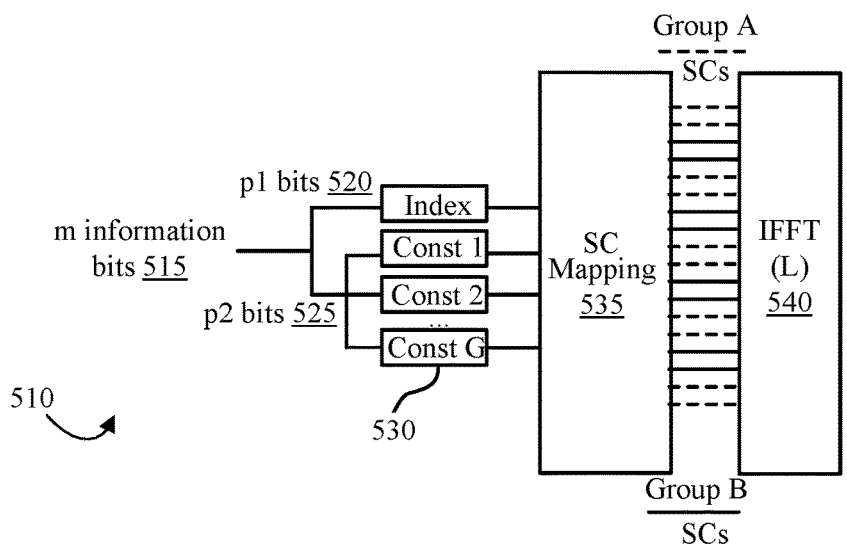
Figure 5C:
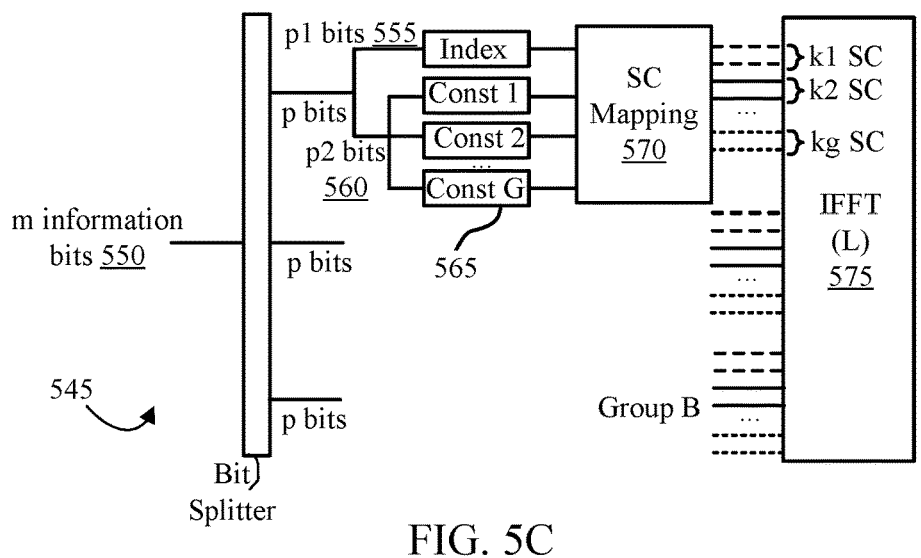

FIGS. 5A through 5C illustrate examples of block diagrams of a constellation 505, a transmitter 510, and a transmitter 545 that support techniques for managing PAPR in accordance with one or more aspects of the present disclosure. In some examples, the constellation 505, the transmitter 510, and the transmitter 545 may implement aspects of the wireless communications system 100 and the wireless communications system 200 as described in FIGS. 1 and 2, respectively. For example, the transmitter 510 and the transmitter 545 may be examples of a network node 105, a base station 140, a UE 115, or a combination thereof. Additionally, in some examples, the transmitter 510 may implement the MM-OFDM-IM scheme without sub-block partition of FIG. 3 and may implement the MM-OFDM-IM scheme with sub-block partition of FIG. 4.

In the example of FIG. 5A, the constellation 505 may be for phase-shift keying modulation with four groups (e.g., Group A, Group B, Group C and Group D). The constellation 505 may provide a graphic representation of a digitally modulated signal including constellation points corresponding to the four groups (e.g., Group A, Group B, Group C and Group D). In some examples, the constellation 505 may be designed to provide distinguishable four groups (e.g., Group A, Group B, Group C and Group D).

In the example of FIG. 5B, the transmitter 510 may be configured to support an MM-OFDM-IM scheme without sub-block partition. Information bits 515 may be split into part-one bits 520 and part-two bits 525. The part-two bits 525 may be split into G groups 530. The G groups 530 and the part-one bits 520 may be input to a SC mapping unit 535 and then may be input to an inverse fast Fourier transform (IFFT) 540.

In the example of FIG. 5C, the transmitter 545 may be configured to support an MM-OFDM-IM scheme with sub-block partition. Information bits 550 may be split into part-one bits 555 and part-two bits 560. The part-two bits 560 may be split into G groups 565. The G groups 565 and the part-one bits 555 may be input to a SC mapping unit 570 and then may be input to an IFFT 575.

With reference to FIGS. 5B and 5C, a PAPR may be reduced by adding extra bits or symbols (e.g., the third subset of information bits). For example, PAPR may be reduced by adding 2 bits generated with LBC to every four bits of an information bits stream, such as adding 11, 01, 10 bits generated with LBC to the information bits stream of 100010011000 resulting in a sequence 1000 11 1001 01 1000 10. However, adding these extra bits generated with LBC may reduce spectral efficiency since for a given number of SCs, the number of data bits or symbols may be reduced to account for the coded bits or symbols. In some examples, the MM-OFDM-IM scheme may provide spectral efficient gains to convention OFDM. The spectral efficiency gains of the MM-OFDM-IM scheme is $\lceil \log_2(G) \rceil$ bits per SC where G is the number of groups. In some examples, the MM-OFDM-IM scheme may be used to improve the efficiency reduced by adding the extra bits or symbols generated with LBC.

In some other examples, another way to reduce the PAPR may be an interleaving technique that reorders the information bit sequence. For the interleaving technique, several interleaved versions of the input symbols for the IFFT may be evaluated and the version with the smallest PAPR may be selected. The interleaving technique for reducing PAPR may share side information indicating the selected interleaving scheme with a receiver, which may increase overhead and reduce spectral efficiency. In some examples, the MM-OFDM-IM scheme may be used to reduce overhead and increase spectral efficiency of the interleaving technique. The part-one bits may be used to interleave the part-two bits, and the MM-OFDM-IM scheme receiver may detect the interleaving pattern from the part-one bits without receiving an indication of the selected interleaving scheme.

Figure 6:
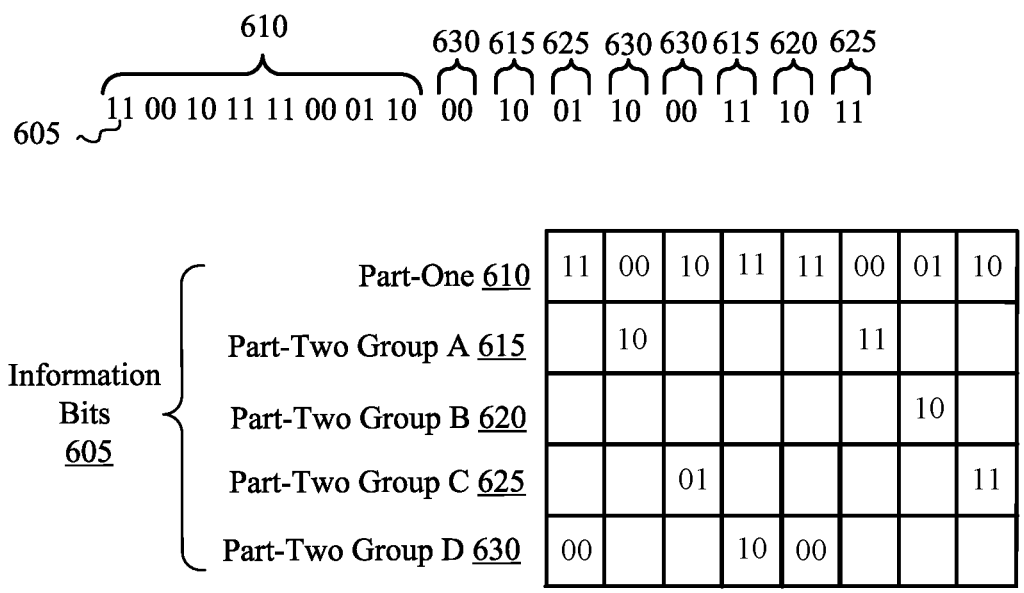
FIGS. 6 through 8 illustrate examples of index modulation schemes that support techniques for managing PAPR in accordance with one or more aspects of the present disclosure.

FIG. 6 illustrates an example of an index modulation scheme 600 that supports techniques for managing PAPR in accordance with one or more aspects of the present disclosure. In some examples, the index modulation scheme 600 may implement aspects of the wireless communications system 100 and the wireless communications system 200 as described in FIGS. 1 and 2, respectively. For example, the index modulation scheme 600 may be a MM-OFDM-IM scheme without sub-block partition.

To reduce PAPR for a MM-OFDM-IM scheme waveform, extra bits or symbols (e.g., the third subset of information bits) may be added to the input data sequence. The extra bits or symbols may be generated using LBC. One or more of part-one or part-two group(s) may be used for the extra bits or symbols. FIG. 6 illustrates an example MM-OFDM-IM scheme without sub-block partition with four part-two groups.

A communication device, such as a network node 105, a UE 115, a base station 140, or a combination thereof may convey a set of information bits 605. The set of information bits 605 may be split into a first subset of information bits or part-one bits 610 and a second subset of information bits or part-two bits that may be further split into G groups (e.g., four groups), such as part-two group A bits 615, part-two group B bits 620, part-two group C bits 625 and part-two group D bits 630. For the following description, the first subset of information bits will be referred to as part-one bits 610, and the second subset of information bits will be referred to as part-two bits.

The part-one bits 610 may be used to determine the part-two group, such as 00 indicating the part-two group A bits 615, 01 indicating the part-two group B bits 620, 10 indicating the part-two group C bits 625, and 11 indicating the part-two group D bits 630. For the example illustrated in FIG. 6, the number of bits of the part-one bits 610 is 16 bits, the number of part-two group A bits 615 is 4 bits, the number of part-two group B bits 620 is 2 bits, the number of part-two group C bits 625 is 4 bits, and the number of part-two group D bits 630 is 6 bits. The part-two group C bits 625 may be the extra bits (e.g., the third subset of information bits) generated with LBC.

The communication device may encode the set of information bits 605 and may transmit a signal including the encoded set of information bits. Another communication device (e.g., a network node 105, a UE 115, a base station 140, or a combination thereof) may receive the signal and may identify a sequence associated with the signal. The communication device (e.g., the network node 105, the UE 115, the base station 140, or a combination thereof may) may decode the sequence using an index demodulation scheme to identify the part-one bits, the part-two bits and extra bits (e.g., the third subset of information bits) generated with LBC. The extra bits generated with LBC may be discarded.

Figure 7:
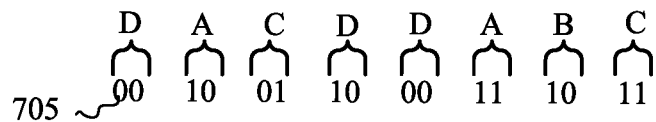

FIG. 7 illustrates an example of an index modulation scheme 700 that supports techniques for managing PAPR in accordance with one or more aspects of the present disclosure. In some examples, the index modulation scheme 700 may implement aspects of the wireless communications system 100 and the wireless communications system 200 as described in FIGS. 1 and 2, respectively. For example, the index modulation scheme 700 may be a MM-OFDM index modulation scheme without sub-block partition.

In some examples, to reduce PAPR for a MM-OFDM-IM scheme waveform, the first subset of information bit or part-one bits may be used to interleave or reorder the second subset of information bits or part-two bits. For the interleaving technique, several interleaved versions of the sequence of information bits may be evaluated by the IFFT and the interleaved version with the smallest PAPR may be selected for transmission. This interleaving technique with the MM-OFDM-IM scheme may not signal the interleaving scheme to the receiving device; rather, the receiving device may detect the part-one bits and may identify the interleaved part-two bits without knowing the interleaving scheme.

In the example of FIG. 7, a communication device, such as a network node 105, a UE 115, a base station 140, or a combination thereof may be configured to support an MM-OFDM-IM scheme without sub-block partition with four part-two groups. The communication device (e.g., the network node 105, the UE 115, the base station 140, or a combination thereof) may convey a set of information bits. The set of information bits may be split into a first subset of information bits or part-one bits and a second subset of information bits or part-two bits that may be further split into G groups (e.g., four groups), such as part-two group A bits, part-two group B bits, part-two group C bits and part-two group D bits. For the following description, the first subset of information bits will be referred to as part-one bits, and the second subset of information bits will be referred to as part-two bits.

In some examples, a first interleaving scheme may be applied to the part-one bits to reorder the part-two bits. For the example of FIG. 7, the first interleaving scheme may interleave the part-one bits to provide a first interleaved version part-one bits 710-a. A second interleaving scheme may be applied to the part-one bits to reorder the part-two bits. For example, the second interleaving scheme may interleave the part-one bits to provide a second interleaved version part-one bits 710-b. The part-two information bits 705 may be split into the four groups (e.g., group A, group B, group C and group D). The part-one bits may be used to determine the part-two group, such as 00 indicating the part-two group A, 01 indicating the part-two group B, 10 indicating the part-two group C, and 11 indicating the part-two group D. For the example illustrated in FIG. 7, the number of bits of the part-one bits is 16 bits, the number of part-two group A bits is 4 bits, the number of part-two group B bits is 2 bits, the number of part-two group C bits is 4 bits, and the number of part-two group D bits is 6 bits.

As shown in the example of FIG. 7, the first interleaved version part-one bits 710-a provide an order for the part-two group A bits 715-a, the part-two group B bits 720-a, the part-two group C bits 725-a and the part-two group D bits 730-a. The second interleaved version part-one bits 710-b provide another order for the part-two group A bits 715-b, the part-two group B bits 720-b, the part-two group C bits 725-b and the part-two group D bits 730-b. The first interleaved version of information bits and the second interleaved version of information bits may be evaluated by the IFFT and the interleaved version with the smallest PAPR may be selected for transmission. This interleaving technique with MM-OFDM-IM scheme may not provide an indication of the interleaving scheme to the receiving device; rather, the receiving device may detect the part-one bits and may identify the interleaved part-two bits without knowing the interleaving scheme associated with the received sequence.

In some examples, to reduce PAPR for a MM-OFDM-IM scheme waveform, the extra bits or symbols technique and the interleaving technique may be combined. For example, the Group C bits shown in FIG. 7 may be the extra bits generated with LBC. For the first interleaved version, the extra bits generated with LBC (e.g., the third subset of information bits) may be part-two Group C bits 725-a. For the second interleaved version, the extra bits generated with LBC (e.g., the third subset of information bits) may be part-two Group C bits 725-b. The first interleaved version of information bits including extra bits in part-two group C bits 725-a and the second interleaved version of information bits including extra bits in part-two group C bits 725-b may be evaluated by the IFFT and the interleaved version with the smallest associated PAPR may be selected for transmission.

In some examples, for the technique to manage PAPR using extra bits generated with LBC, the part-two group used for the extra bits may be different per allocation based on an evaluation for the PAPR. For example, multiple versions of the sequence may be generated with the extra bits placed in different groups of the part-two bits, and each of the sequences may be evaluated by the IFFT. The version of the sequence with the smallest associated PAPR may be selected for transmission. In some examples, the part-two group with the extra bits generated with LBC may be indicated to the receiving device, and the part-two group with the extra LBC bits may be discarded by the receiving device.

In some examples, for the technique to lower PAPR using extra bits generated with LBC, the number of part-two groups may be selected based on the number of extra bits used to reduce PAPR. For example, the number of part-two groups may be $G=2^p$ where G is the number of groups and p. is the number of extra bits. If the number of extra bits is two, the number of part-two groups is four.

Figure 8:
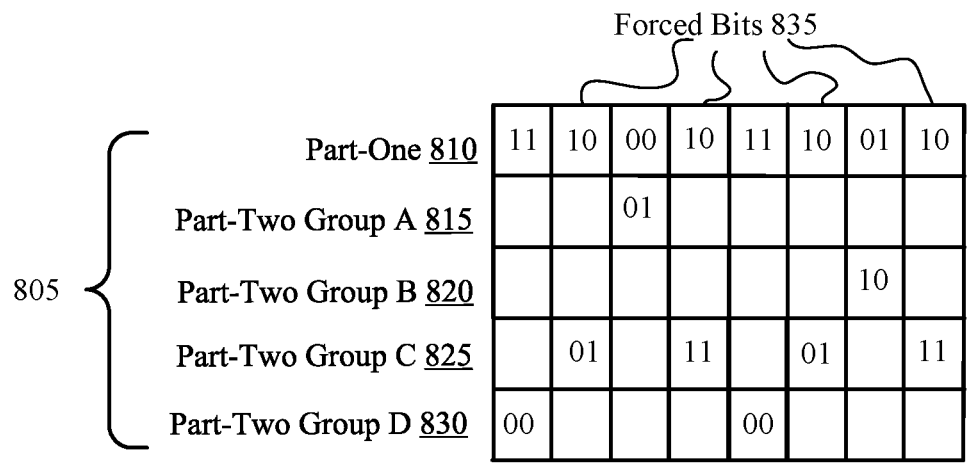

FIG. 8 illustrates an example of an index modulation scheme 800 that supports techniques for managing PAPR in accordance with one or more aspects of the present disclosure. In some examples, the index modulation scheme 800 may implement aspects of the wireless communications system 100 and the wireless communications system 200 as described in FIGS. 1 and 2, respectively. For example, the index modulation scheme 800 may be a MM-OFDM-IM scheme without sub-block partition.

A communication device, such as a network node 105, a UE 115, a base station 140, or a combination thereof may convey a set of information bits 805. The set of information bits 805 may be split into a first subset of information bits or part-one bits 810 and a second subset of information bits or part-two bits. The part-two bits may be further split into G groups (e.g., four groups), such as part-two group A bits 815, part-two group B bits 820, part-two group C bits 825 and part-two group D bits 830. For the following description, the first subset of information bits will be referred to as part-one bits 810, and the second subset of information bits will be referred to as part-two bits. The part-one bits may be used to determine the part-two group, such as 00 indicating the part-two group A bits 815, 01 indicating the part-two group B bits 820, 10 indicating the part-two group C bits 825, and 11 indicating the part-two group D bits 830. For the example illustrated in FIG. 8, the number of bits of the part-one bits is 16 bits, the number of part-two group A bits is 2 bits, the number of part-two group B bits is 2 bits, the number of part-two group C bits is 8 bits, and the number of part-two group D bits is 4 bits.

In some examples, the extra bits may be placed at specific locations in the sequence of information bits (e.g., every Nth data bits). The part-one bits 810 may be changed to indicate the location of the part-two group with the extra bits. For the example illustrated in FIG. 8, the extra bits are placed every two bits. The part-one bits 810 may be changed to force the spacing of the part-two group with extra bits; these part-one bits may be called forced bits 835. For the illustrated example, part-two group C has the extra bits. The forced bits 835 of the part-one bits indicate the locations of the part-two group C bits 825 as every two bits. In some examples, the forced bits 835 may be indicated to the receiving device, and the receiving device may discard the forced bits 835.

Figure 9:
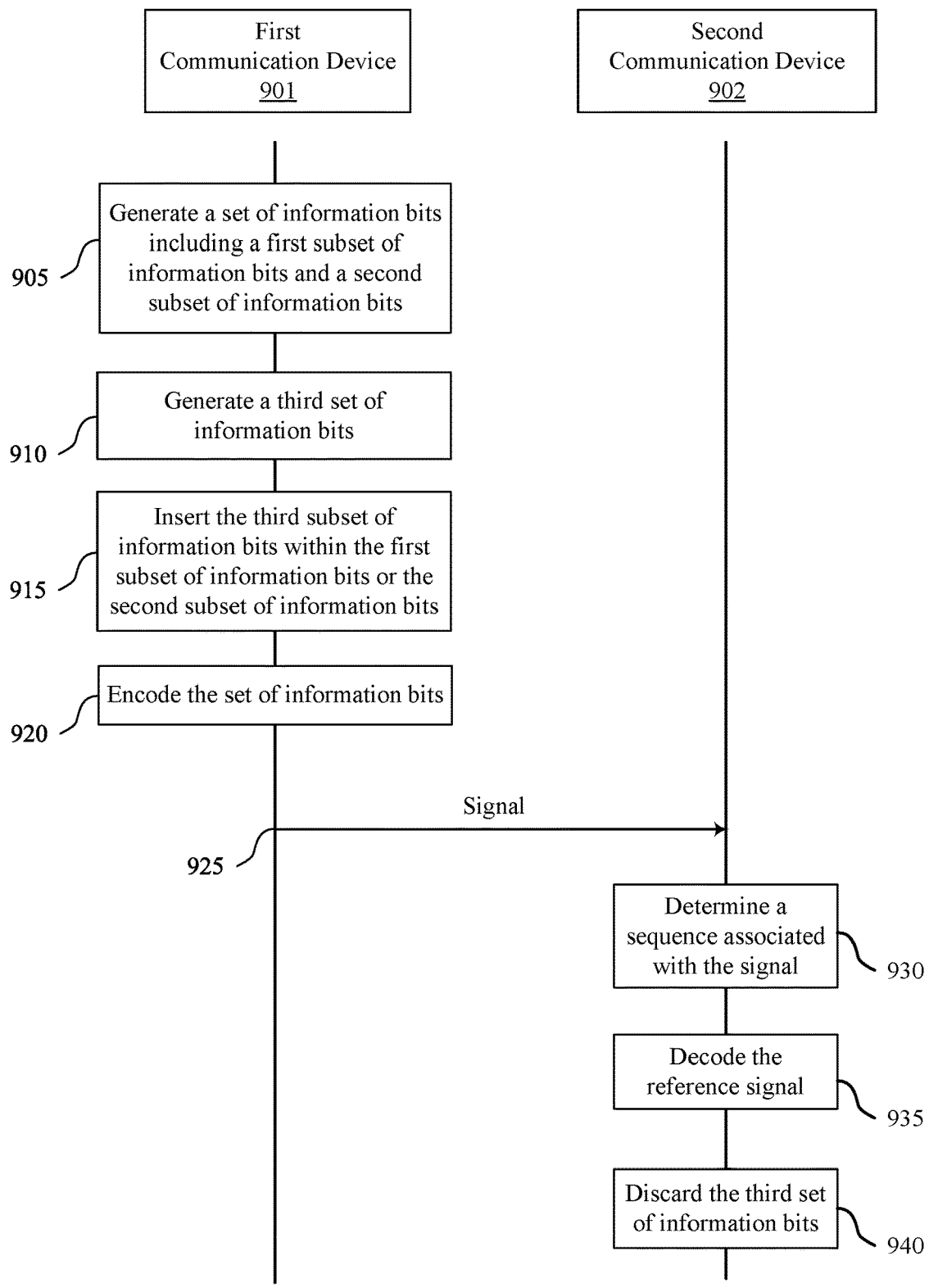
FIG. 9 illustrates an example of a process flow that supports techniques for managing PAPR in accordance with one or more aspects of the present disclosure.

FIG. 9 illustrates an example of a process flow 900 that supports techniques for managing PAPR in accordance with one or more aspects of the present disclosure. The process flow 900 may implement aspects of the wireless communications system 100 and the wireless communications system 200. The process flow 900 may include a first communication device 901 (e.g., a network node 105, a UE 115, a base station 140, or a combination thereof may) and a second communication device 902 (e.g., a network node 105, a UE 115, a base station 140, or a combination thereof may), which may be examples of the first communication device 901 and the second communication device 902 as described herein. In the following description of the process flow 900, the operations between the first communication device 901 and the second communication device 902 may be transmitted in a different order than the example order shown, or the operations performed by the first communication device 901 and the second communication device 902 may be performed in different orders or at different times. Some operations may also be omitted from the process flow 900, and other operations may be added to the process flow 900.

At 905, the first communication device 901 may generate a set of information bits to convey to the second communication device 902 via an index modulation scheme. The set of information bits may include a first subset of information bits and a second subset of information bits. At 910, the first communication device 901 may generate a third subset of information bits based at least in part on a linear coding scheme. At 915, the first communication device 901 may insert the third subset of information bits within the first subset of information bits or the second subset of information bits. At 920, the first communication device 901 may encode the set of information bits. At step 925, the first communication device 901 may transmit, to the second communication device 902, a signal including the encoded set of information bits.

In some examples, the first communication device 901 may select a first group of information bits and a second group of information bits from a plurality of groups of information bits. The second subset of information bits may include the first group of information bits and the second group of information bits. In some examples, the first communication device 901 may insert the third subset of information bits within the first group of information bits or the second group of information bits. In some examples, the first communication device 901 may transmit, to the second communication device 902, an indication of the first group of information bits including the third subset of information bits or the second group of information bits including the third subset of information bits. In some examples, the first communication device 901 may insert the third subset of information bits within the first group of information bits or the second group of information bits based at least on a PAPR associated with the encoded set of information bits.

In some examples, the first communication device 901 may determine a quantity of groups of information bits based at least on a quantity of information bits of the third subset of information bits. The first communication device 901 may insert the third subset of information bits within at least one of the quantity of groups of information bits. The first communication device 901 may transmit, to the second communication device 902, an indication of the at least one of the quantity of groups of information bits including the third subset of information bits. The first communication device 901 may insert the third subset of information bits within the at least one of the quantity of groups of information bits based at least on a PAPR associated with the encoded set of information bits.

In some examples, the first communication device 901 may insert the third subset of information bits within at least one group of a plurality of groups of information bits, and the first communication device 901 may insert a set of forced bits within the first subset of information bits for indicating one or more locations of the third subset of information bits. The first communication device 901 may transmit, to the second communication device 902, an indication of the set of forced bits.

In some examples, the first communication device 901 may interleave the first subset of information bits using a first interleaving scheme to generate a first interleaved subset of information bits. The first communication device 901 may interleave the first subset of information bits using a second interleaving scheme to generate a second interleaved first subset of information bits. The first communication device 901 may select the first interleaved first subset of information bits or the second interleaved first subset of information bits based at least on a PAPR associated with the encoded set of information bits. The encoded set of information bits may be based on at least in part on the selection of the first interleaved subset first subset of information bits or the second interleaved first subset of information bits.

The second communication device 902 may receive, from the first communication device 901, the signal. At 930, the second communication device 902 may determine a sequence associated with the signal. At 935, the second communication device 902 may decode the sequence based at least in part on an index demodulation scheme to identify a first subset of information bits of a set of information bits encoded in the signal, a second subset of information bits of the set of information bits encoded in the signal, and a third subset of bits of the set of information bits encoded in the signal based at least in part on the sequence. At 940, the second communication device 902 may discard the third subset of information bits. In some examples, the second communication device 902 may identify a first group of information bits of the second subset of information bits and a second group of information bits of the second subset of information bits. In some examples, second communication device 902 may receive, from the first device, the indication of the first group of information bits including the third subset of information bits or the second group of information bits including the third subset of information bits, and the second communication device 902 may identify the third subset of information bits based at least in part on the indication. In some examples, the second communication device 902 decoding the sequence may include the second communication device 902 identifying a quantity of groups of information bits of the second subset of information bits. In some examples, the second communication device 902 may receive, from the first communication device 901, an indication of the quantity of groups of information bits including the third subset of information bits, and the second communication device 902 may identify the third subset of information bits based at least in part on the indication. In some examples, the second communication device 902 may receive, from the first communication device 901, an indication of the forced bits within the first subset of information bits and may identify the third subset of information bits based at least in part on the indication.

In some examples, the index modulation scheme includes a MM-OFDM-IM scheme. In some examples, the third subset of information bits includes one or more bits of the first subset of information bits or the second subset of information bits. In some examples, the signal comprises a MM-OFDM-IM scheme waveform. In some examples, the first communication device 901 may be a UE and the second communication device 902 may be a network node. In some examples, the first communication device 901 may be a network node and the second communication device 902 may be a UE. In some examples, the first communication device 901 may be a UE and the second communication device 902 may be a UE.

Figure 10:
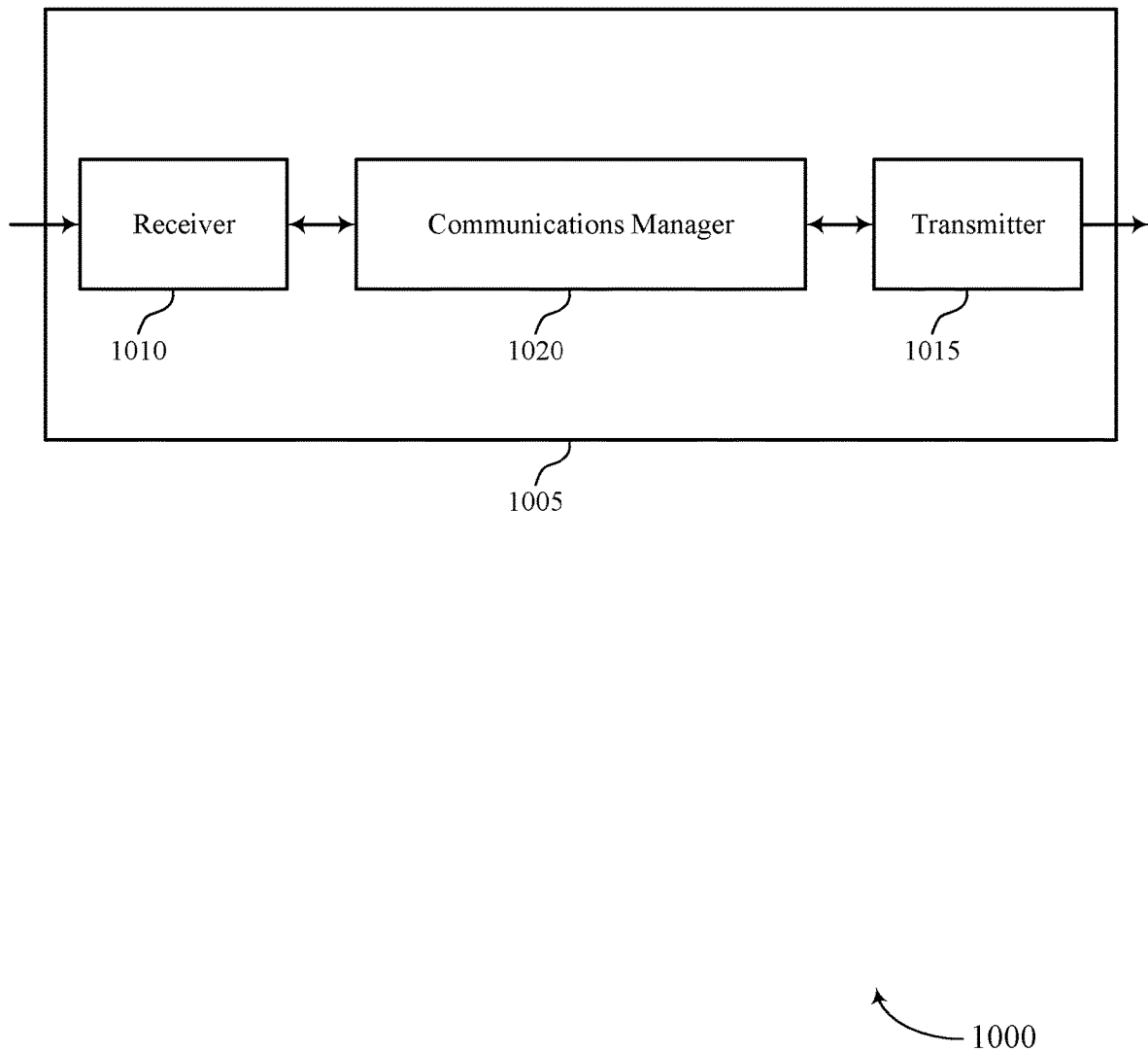
FIGS. 10 and 11 illustrate block diagrams of devices that support techniques for managing PAPR in accordance with one or more aspects of the present disclosure.

FIG. 10 illustrates a block diagram 1000 of a device 1005 that supports techniques for managing PAPR in accordance with one or more aspects of the present disclosure. The device 1005 may be an example of aspects of a network node 105 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to perform the techniques for managing PAPR features discussed herein. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for managing PAPR as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first device (e.g., the device 1005) in accordance with examples as disclosed herein. For example, the communications manager 1020 may be configured as or otherwise support a means for generating a set of information bits to convey to a second device via an index modulation scheme, the set of information bits including a first subset of information bits and a second subset of information bits. The communications manager 1020 may be configured as or otherwise support a means for generating a third subset of information bits based on a linear coding scheme. The communications manager 1020 may be configured as or otherwise support a means for inserting the third subset of information bits within the first subset of information bits or the second subset of information bits. The communications manager 1020 may be configured as or otherwise support a means for encoding the set of information bits based on the inserting. The communications manager 1020 may be configured as or otherwise support a means for transmitting, to the second device, a signal including the encoded set of information bits.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, more efficient utilization of communication resources.

Figure 11:
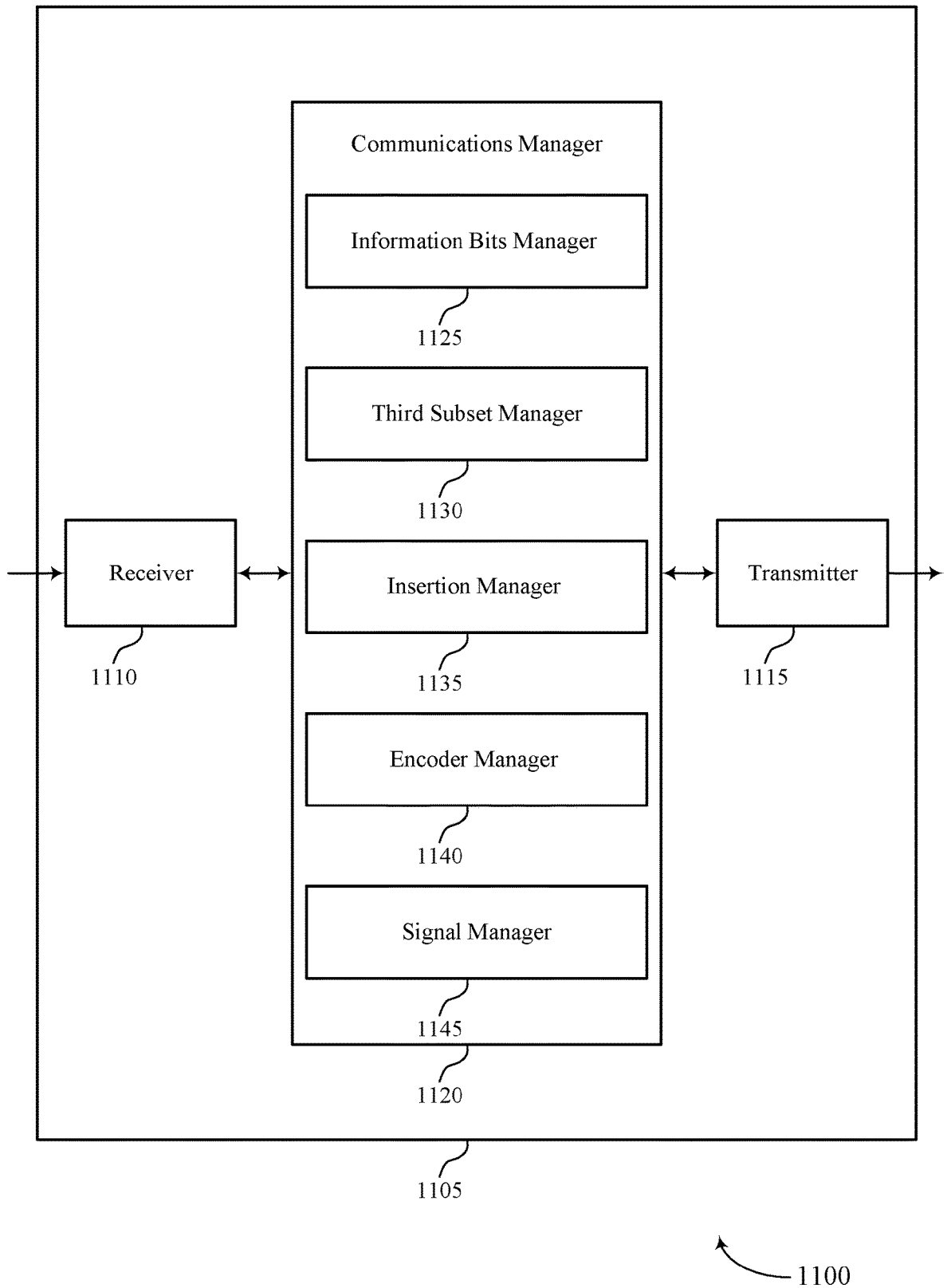

FIG. 11 illustrates a block diagram 1100 of a device 1105 that supports techniques for managing PAPR in accordance with one or more aspects of the present disclosure. The device 1105 may be an example of aspects of a device 1005 or a network node 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for managing PAPR as described herein. For example, the communications manager 1120 may include an information bits manager 1125, a third subset manager 1130, an insertion manager 1135, an encoder manager 1140, a signal manager 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first device (e.g., the device 1105) in accordance with examples as disclosed herein. The information bits manager 1125 may be configured as or otherwise support a means for generating a set of information bits to convey to a second device via an index modulation scheme, the set of information bits including a first subset of information bits and a second subset of information bits. The third subset manager 1130 may be configured as or otherwise support a means for generating a third subset of information bits based on a linear coding scheme. The insertion manager 1135 may be configured as or otherwise support a means for inserting the third subset of information bits within the first subset of information bits or the second subset of information bits. The encoder manager 1140 may be configured as or otherwise support a means for encoding the set of information bits based on the inserting. The signal manager 1145 may be configured as or otherwise support a means for transmitting, to the second device, a signal including the encoded set of information bits.

In some cases, the information bits manager 1125, the third subset manager 1130, the insertion manager 1135, the encoder manager 1140, and the signal manager 1145 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the information bits manager 1125, the third subset manager 1130, the insertion manager 1135, the encoder manager 1140, and the signal manager 1145 discussed herein. A transceiver processor may be collocated with and/or communicate with (e.g., direct the operations of) a transceiver of the device 1105. A radio processor may be collocated with and/or communicate with (e.g., direct the operations of) a radio (e.g., an NR radio, an LTE radio, a Wi-Fi radio) of the device 1105. A transmitter processor may be collocated with and/or communicate with (e.g., direct the operations of) a transmitter of the device 1105. A receiver processor may be collocated with and/or communicate with (e.g., direct the operations of) a receiver of the device 1105.

Figure 12:
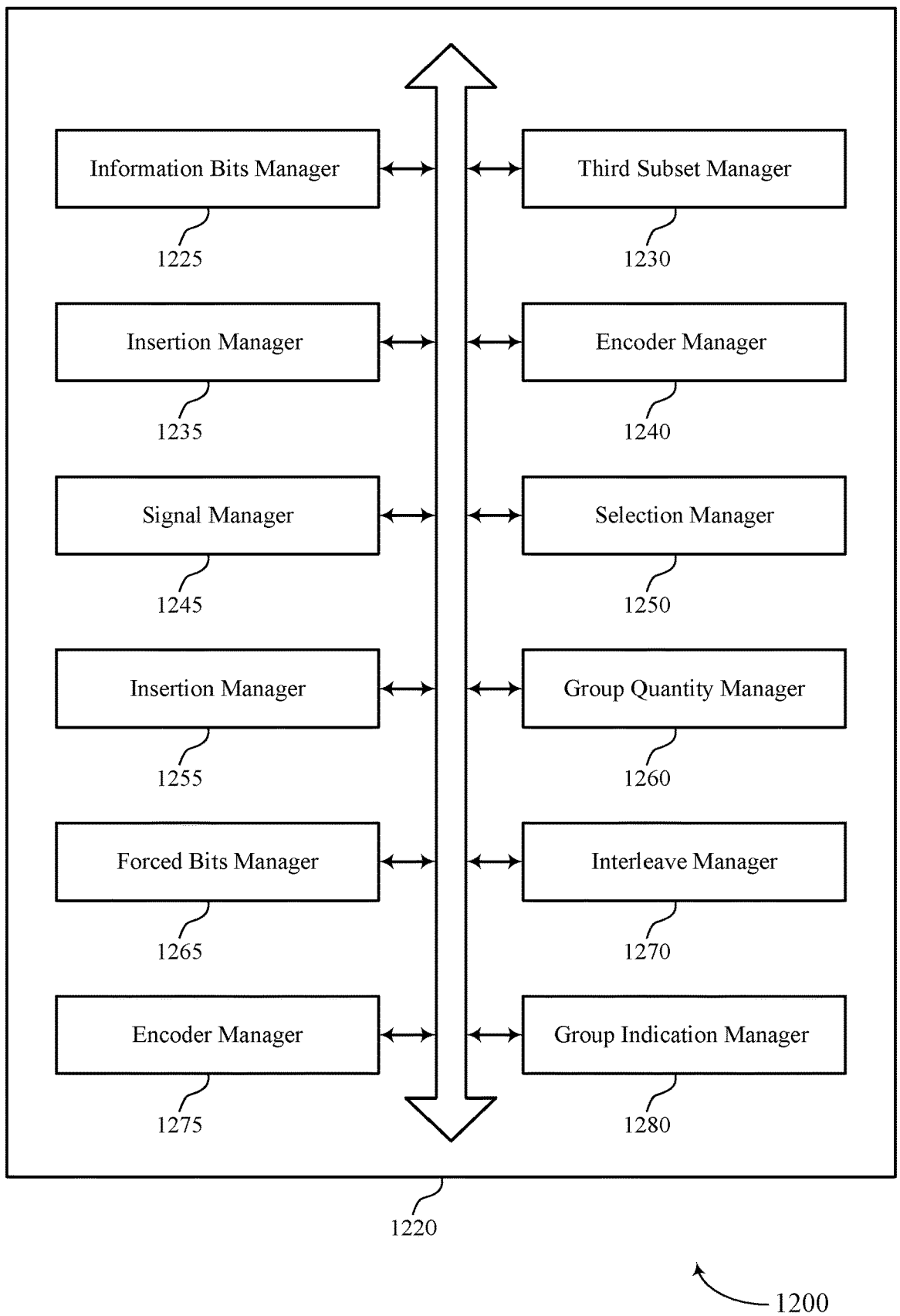
FIG. 12 illustrates a block diagram of a communications manager that supports techniques for managing PAPR in accordance with one or more aspects of the present disclosure.

FIG. 12 illustrates a block diagram 1200 of a communications manager 1220 that supports techniques for managing PAPR in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for managing PAPR as described herein. For example, the communications manager 1220 may include an information bits manager 1225, a third subset manager 1230, an insertion manager 1235, an encoder manager 1240, a signal manager 1245, a selection manager 1250, an insertion manager 1255, a group quantity manager 1260, a forced bits manager 1265, an interleave manager 1270, an encoder manager 1275, a group indication manager 1280, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network node 105, between devices, components, or virtualized components associated with a network node 105), or any combination thereof.

The communications manager 1220 may support wireless communication at a first device in accordance with examples as disclosed herein. The information bits manager 1225 may be configured as or otherwise support a means for generating a set of information bits to convey to a second device via an index modulation scheme, the set of information bits including a first subset of information bits and a second subset of information bits. The third subset manager 1230 may be configured as or otherwise support a means for generating a third subset of information bits based on a linear coding scheme. The insertion manager 1235 may be configured as or otherwise support a means for inserting the third subset of information bits within the first subset of information bits or the second subset of information bits. The encoder manager 1240 may be configured as or otherwise support a means for encoding the set of information bits based on the inserting. The signal manager 1245 may be configured as or otherwise support a means for transmitting, to the second device, a signal including the encoded set of information bits.

In some examples, the information bits manager 1225 may be configured as or otherwise support a means for selecting a first group of information bits and a second group of information bits from a set of multiple groups of information bits, where the second subset of information bits includes the first group of information bits and the second group of information bits. In some examples, where inserting the third subset of bits includes: inserting the third subset of information bits within the first group of information bits or the second group of information bits.

In some examples, the group indication manager 1280 may be configured as or otherwise support a means for transmitting, to the second device, an indication of the first group of information bits, including the third subset of information bits or the second group of information bits including the third subset of information bits, based on the inserting.

In some examples, to support inserting the third subset of information bits within the first group of information bits or the second group of information bits, the insertion manager 1255 may be configured as or otherwise support a means for inserting the third subset of information bits within the first group of information bits or the second group of information bits based at least on a PAPR associated with the encoded set of information bits.

In some examples, the group quantity manager 1260 may be configured as or otherwise support a means for determining a quantity of groups of information bits based at least on a quantity of information bits of the third subset of information bits. In some examples, the insertion manager 1255 may be configured as or otherwise support a means for inserting the third subset of information bits within at least one of the quantity of groups of information bits.

In some examples, the group indication manager 1280 may be configured as or otherwise support a means for transmitting, to the second device, an indication of the at least one of the quantity of groups of information bits including the third subset of information bits.

In some examples, to support inserting the third subset of information bits within the at least one of the quantity of groups of information bits, the insertion manager 1255 may be configured as or otherwise support a means for inserting the third subset of information bits within the at least one of the quantity of groups of information bits based at least on a PAPR associated with the encoded set of information bits.

In some examples, to support inserting the third subset of information bits, the insertion manager 1255 may be configured as or otherwise support a means for inserting the third subset of information bits within at least one group of a set of multiple groups of information bits. In some examples, to support inserting the third subset of information bits, the forced bits manager 1265 may be configured as or otherwise support a means for inserting a set of forced bits within the first subset of information bits for indicating one or more locations of the third subset of information bits.

In some examples, the forced bits manager 1265 may be configured as or otherwise support a means for transmitting, to the second device, an indication of the set of forced bits.

In some examples, the interleave manager 1270 may be configured as or otherwise support a means for interleaving the first subset of information bits using a first interleaving scheme to generate a first interleaved subset of information bits. In some examples, the interleave manager 1270 may be configured as or otherwise support a means for interleaving the first subset of information bits using a second interleaving scheme to generate a second interleaved first subset of information bits. In some examples, the interleave manager 1270 may be configured as or otherwise support a means for selecting the first interleaved first subset of information bits or the second interleaved first subset of information bits based at least on a PAPR associated with the encoded set of information bits. In some examples, the encoder manager 1275 may be configured as or otherwise support a means for encoding the set of information bits based on the selecting.

In some examples, the index modulation scheme includes a MM-OFDM-IM scheme.

In some examples, the third subset of information bits includes one or more bits of the first subset of information bits or the second subset of information bits.

In some examples, the signal includes a MM-OFDM-IM scheme waveform.

In some examples, the first device includes a UE and the second device includes a network node.

In some examples, the first device includes a network node and the second device includes a UE.

In some examples, the first device includes a first UE and the second device includes a second UE.

In some cases, the information bits manager 1225, the third subset manager 1230, the insertion manager 1235, the encoder manager 1240, the signal manager 1245, the selection manager 1250, the insertion manager 1255, the group quantity manager 1260, the forced bits manager 1265, the interleave manager 1270, the encoder manager 1275, and the group indication manager 1280 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the information bits manager 1225, the third subset manager 1230, the insertion manager 1235, the encoder manager 1240, the signal manager 1245, the selection manager 1250, the insertion manager 1255, the group quantity manager 1260, the forced bits manager 1265, the interleave manager 1270, the encoder manager 1275, and the group indication manager 1280 discussed herein."

Figure 13:
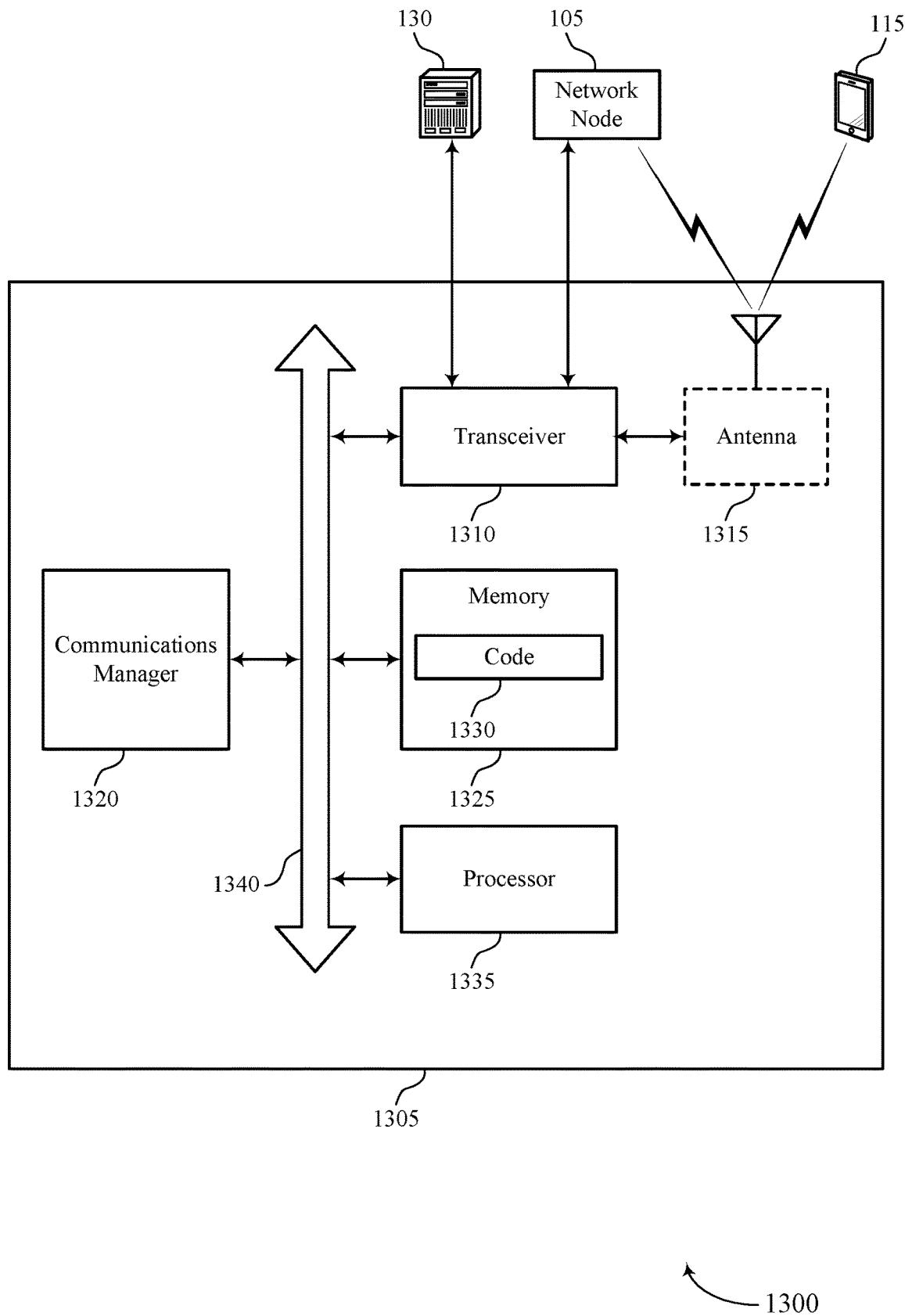
FIG. 13 illustrates a diagram of a system including a device that supports techniques for managing PAPR in accordance with one or more aspects of the present disclosure.

FIG. 13 illustrates a diagram of a system 1300 including a device 1305 that supports techniques for managing PAPR in accordance with one or more aspects of the present disclosure. The device 1305 may be an example of or include the components of a device 1005, a device 1105, or a network node 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for managing PAPR). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system.

A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a first device (e.g., the device 1305) in accordance with examples as disclosed herein. For example, the communications manager 1320 may be configured as or otherwise support a means for generating a set of information bits to convey to a second device via an index modulation scheme, the set of information bits including a first subset of information bits and a second subset of information bits. The communications manager 1320 may be configured as or otherwise support a means for generating a third subset of information bits based on a linear coding scheme. The communications manager 1320 may be configured as or otherwise support a means for inserting the third subset of information bits within the first subset of information bits or the second subset of information bits. The communications manager 1320 may be configured as or otherwise support a means for encoding the set of information bits based on the inserting. The communications manager 1320 may be configured as or otherwise support a means for transmitting, to the second device, a signal including the encoded set of information bits.

By including or configuring the communications manager 1320 in accordance with examples as described herein, the device 1305 may support techniques for improved user experience related to reduced processing, reduced power consumption, more efficient utilization of communication resources, improved coordination between devices, longer battery life, improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for managing PAPR as described herein, or the processor 1335 and the memory 1325 may be otherwise configured to perform or support such operations.

Figure 14:
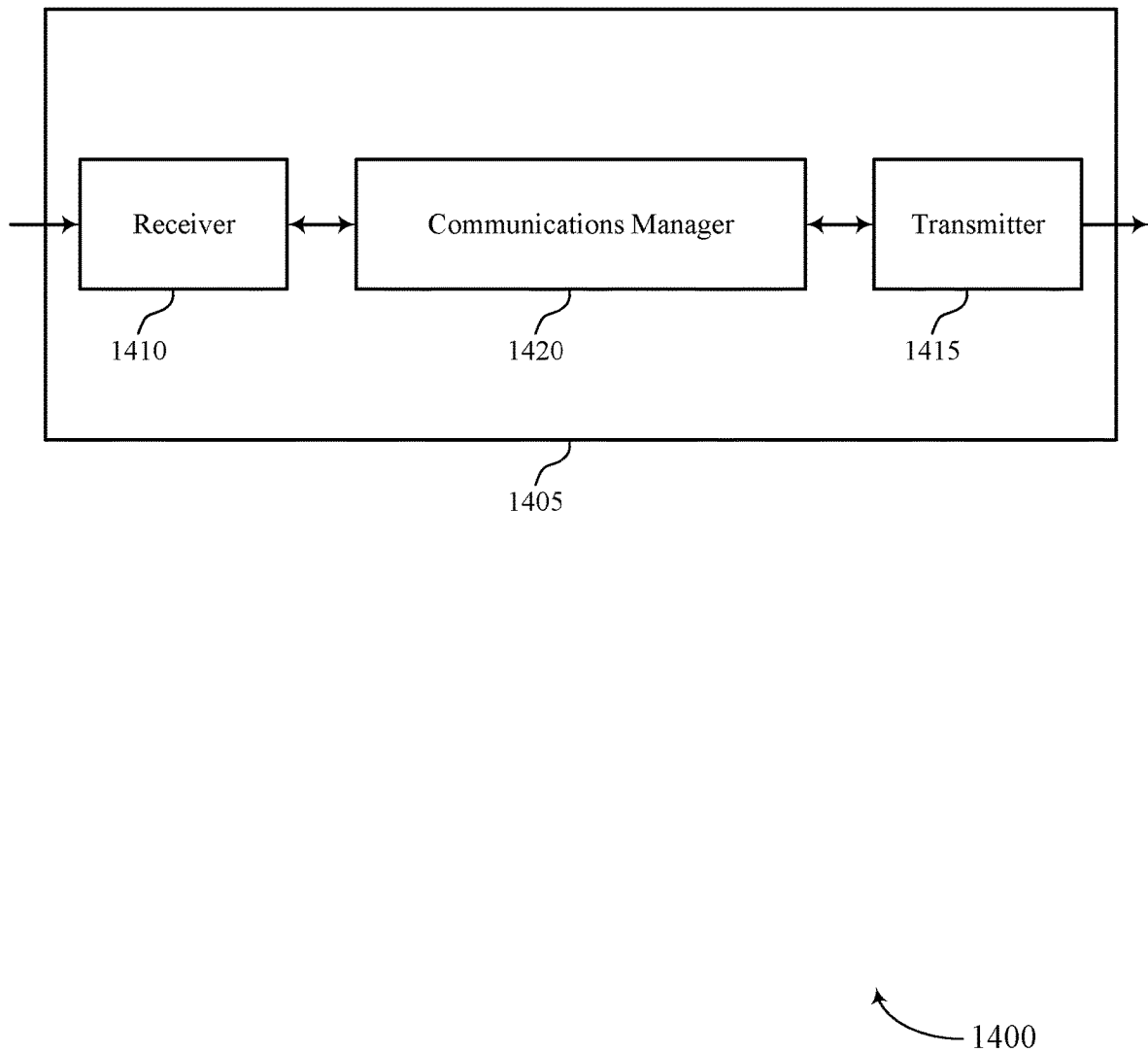
FIGS. 14 and 15 illustrate block diagrams of devices that support techniques for managing PAPR in accordance with one or more aspects of the present disclosure.

FIG. 14 illustrates a block diagram 1400 of a device 1405 that supports techniques for managing PAPR in accordance with one or more aspects of the present disclosure. The device 1405 may be an example of aspects of a UE 115 as described herein. The device 1405 may include a receiver 1410, a transmitter 1415, and a communications manager 1420. The device 1405 may also include one or more processors, memory coupled with the one or more processors, and instructions stored in the memory that are executable by the one or more processors to enable the one or more processors to perform the techniques for managing PAPR features discussed herein. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for managing PAPR). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for managing PAPR). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of techniques for managing PAPR as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a second device (e.g., the device 1405) in accordance with examples as disclosed herein. For example, the communications manager 1420 may be configured as or otherwise support a means for receiving, from a first device, a signal. The communications manager 1420 may be configured as or otherwise support a means for determining a sequence associated with the signal. The communications manager 1420 may be configured as or otherwise support a means for decoding the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence. The communications manager 1420 may be configured as or otherwise support a means for discarding the third subset of information bits based on the decoding.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for reduced processing, reduced power consumption, more efficient utilization of communication resources.

Figure 15:
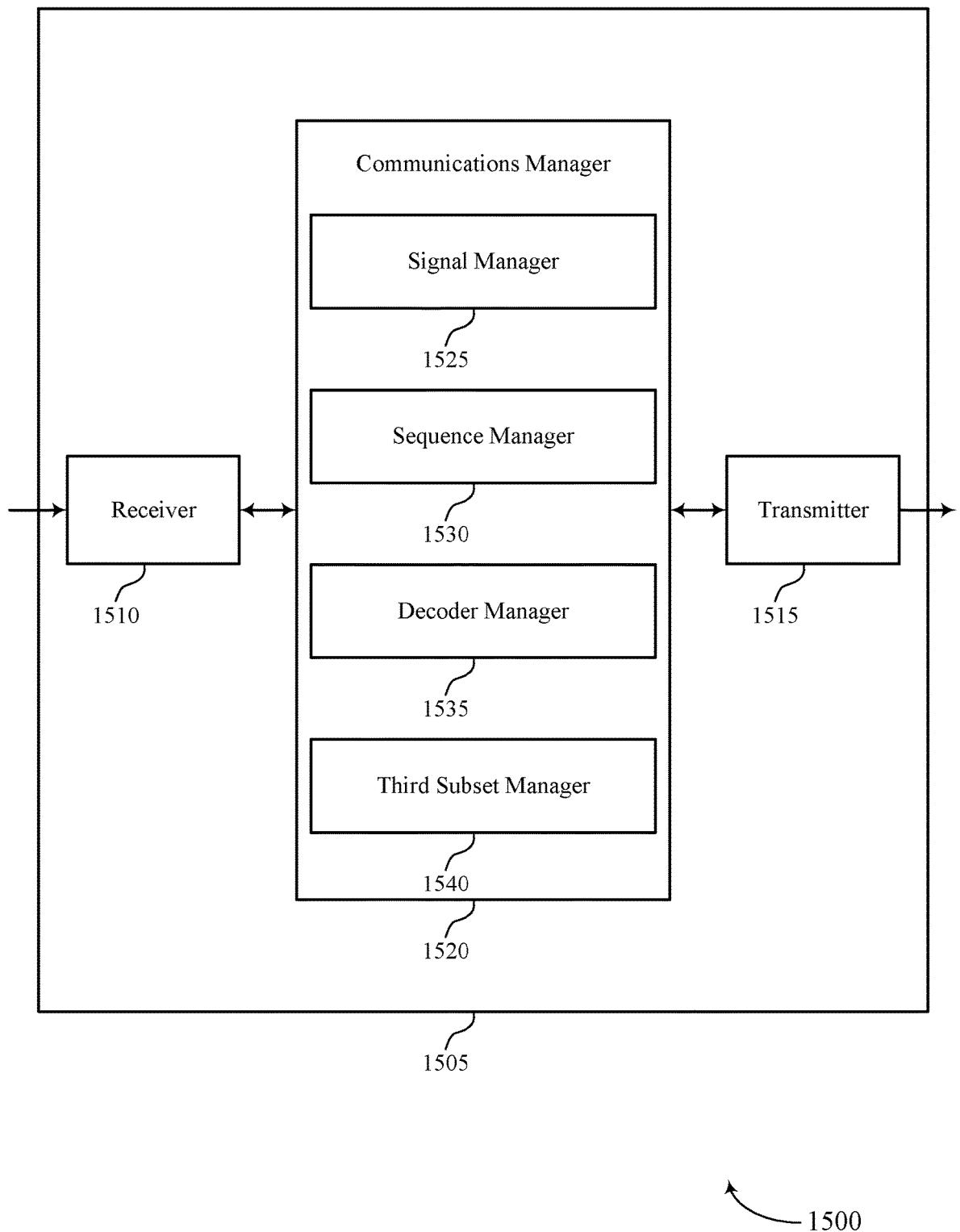

FIG. 15 illustrates a block diagram 1500 of a device 1505 that supports techniques for managing PAPR in accordance with one or more aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for managing PAPR). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for managing PAPR). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of techniques for managing PAPR as described herein. For example, the communications manager 1520 may include a signal manager 1525, a sequence manager 1530, a decoder manager 1535, a third subset manager 1540, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a second device (e.g., the device 1505) in accordance with examples as disclosed herein. The signal manager 1525 may be configured as or otherwise support a means for receiving, from a first device, a signal. The sequence manager 1530 may be configured as or otherwise support a means for determining a sequence associated with the signal. The decoder manager 1535 may be configured as or otherwise support a means for decoding the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence. The third subset manager 1540 may be configured as or otherwise support a means for discarding the third subset of information bits based on the decoding.

In some cases, the signal manager 1525, the sequence manager 1530, the decoder manager 1535, and the third subset manager 1540 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the signal manager 1525, the sequence manager 1530, the decoder manager 1535, and the third subset manager 1540 discussed herein. A transceiver processor may be collocated with and/or communicate with (e.g., direct the operations of) a transceiver of the device 1505. A radio processor may be collocated with and/or communicate with (e.g., direct the operations of) a radio (e.g., an NR radio, an LTE radio, a Wi-Fi radio) of the device 1505. A transmitter processor may be collocated with and/or communicate with (e.g., direct the operations of) a transmitter of the device 1505. A receiver processor may be collocated with and/or communicate with (e.g., direct the operations of) a receiver of the device 1505.

Figure 16:
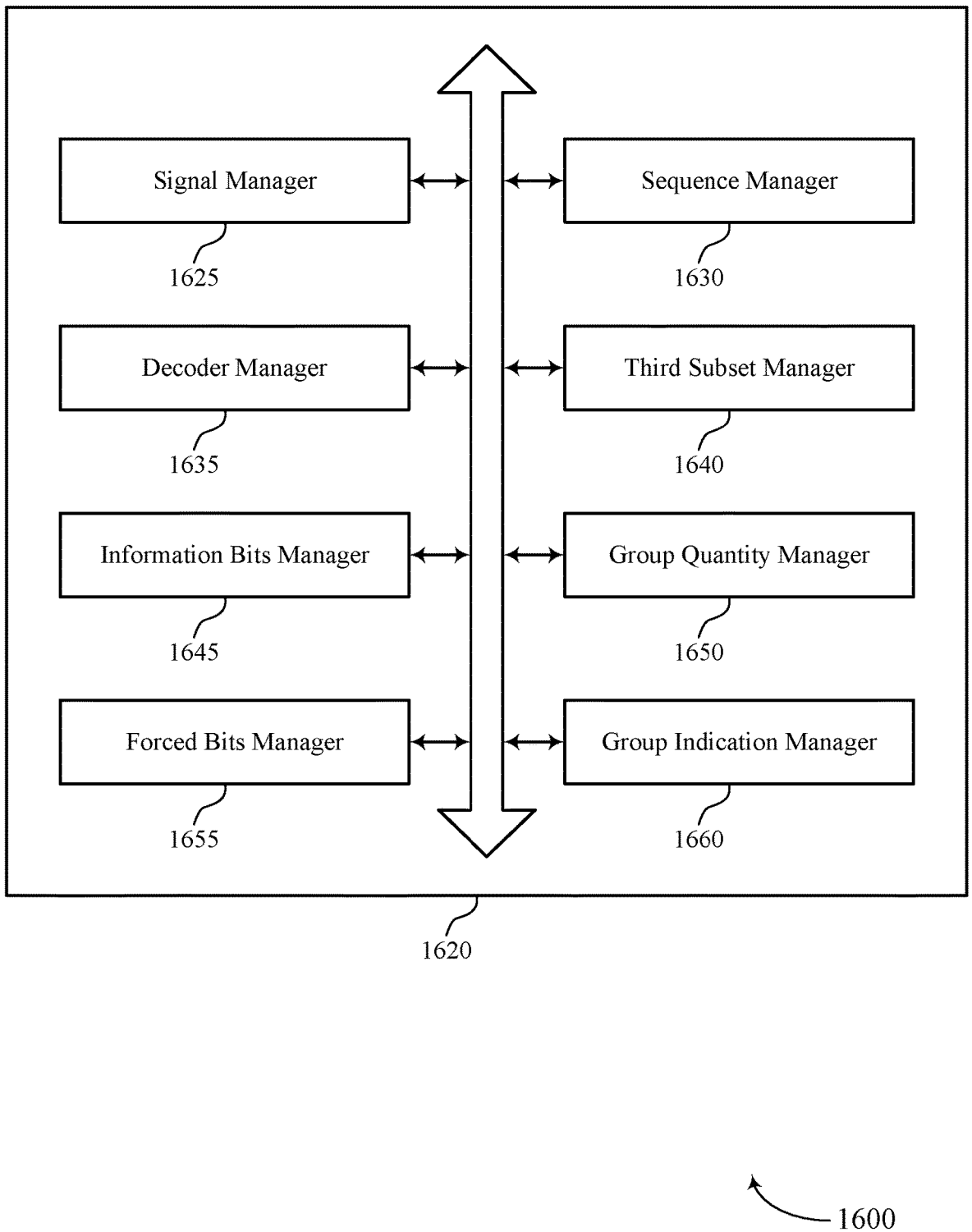
FIG. 16 illustrates a block diagram of a communications manager that supports techniques for managing PAPR in accordance with one or more aspects of the present disclosure.

FIG. 16 illustrates a block diagram 1600 of a communications manager 1620 that supports techniques for managing PAPR in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of techniques for managing PAPR as described herein. For example, the communications manager 1620 may include a signal manager 1625, a sequence manager 1630, a decoder manager 1635, a third subset manager 1640, an information bits manager 1645, a group quantity manager 1650, a forced bits manager 1655, a group indication manager 1660, or any combination thereof. Each of these components may communicate, directly or indirectly, with one another (e.g., via one or more buses).

The communications manager 1620 may support wireless communication at a second device in accordance with examples as disclosed herein. The signal manager 1625 may be configured as or otherwise support a means for receiving, from a first device, a signal. The sequence manager 1630 may be configured as or otherwise support a means for determining a sequence associated with the signal. The decoder manager 1635 may be configured as or otherwise support a means for decoding the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence. The third subset manager 1640 may be configured as or otherwise support a means for discarding the third subset of information bits based on the decoding.

In some examples, to support decoding the sequence, the information bits manager 1645 may be configured as or otherwise support a means for identifying a first group of information bits of the second subset of information bits and a second group of information bits of the second subset of information bits.

In some examples, the group indication manager 1660 may be configured as or otherwise support a means for receiving, from the first device, an indication of the first group of information bits including the third subset of information bits or the second group of information bits including the third subset of information bits. In some examples, the third subset manager 1640 may be configured as or otherwise support a means for identifying the third subset of information bits based on the indication.

In some examples, to support decoding the sequence, the group quantity manager 1650 may be configured as or otherwise support a means for identifying a quantity of groups of information bits of the second subset of information bits.

In some examples, the group indication manager 1660 may be configured as or otherwise support a means for receiving, from the first device, an indication of a group of the quantity of groups of information bits including the third subset of information bits. In some examples, the third subset manager 1640 may be configured as or otherwise support a means for identifying the third subset of information bits based on the indication.

In some examples, the forced bits manager 1655 may be configured as or otherwise support a means for receiving, from the first device, an indication of a set of forced bits within the first subset of information bits. In some examples, the third subset manager 1640 may be configured as or otherwise support a means for identifying the third subset of information bits based on the indication.

In some examples, the signal includes a MM-OFDM-IM scheme waveform.

In some examples, the index demodulation scheme includes a MM-OFDM-IM scheme.

In some examples, the first device includes a UE and the second device includes a network node.

In some examples, the first device includes a network node and the second device includes a UE.

In some examples, the first device includes a first UE and the second device includes a second UE.

In some cases, the signal manager 1625, the sequence manager 1630, the decoder manager 1635, the third subset manager 1640, the information bits manager 1645, the group quantity manager 1650, the forced bits manager 1655, and the group indication manager 1660 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the signal manager 1625, the sequence manager 1630, the decoder manager 1635, the third subset manager 1640, the information bits manager 1645, the group quantity manager 1650, the forced bits manager 1655, and the group indication manager 1660 discussed herein.

Figure 17:
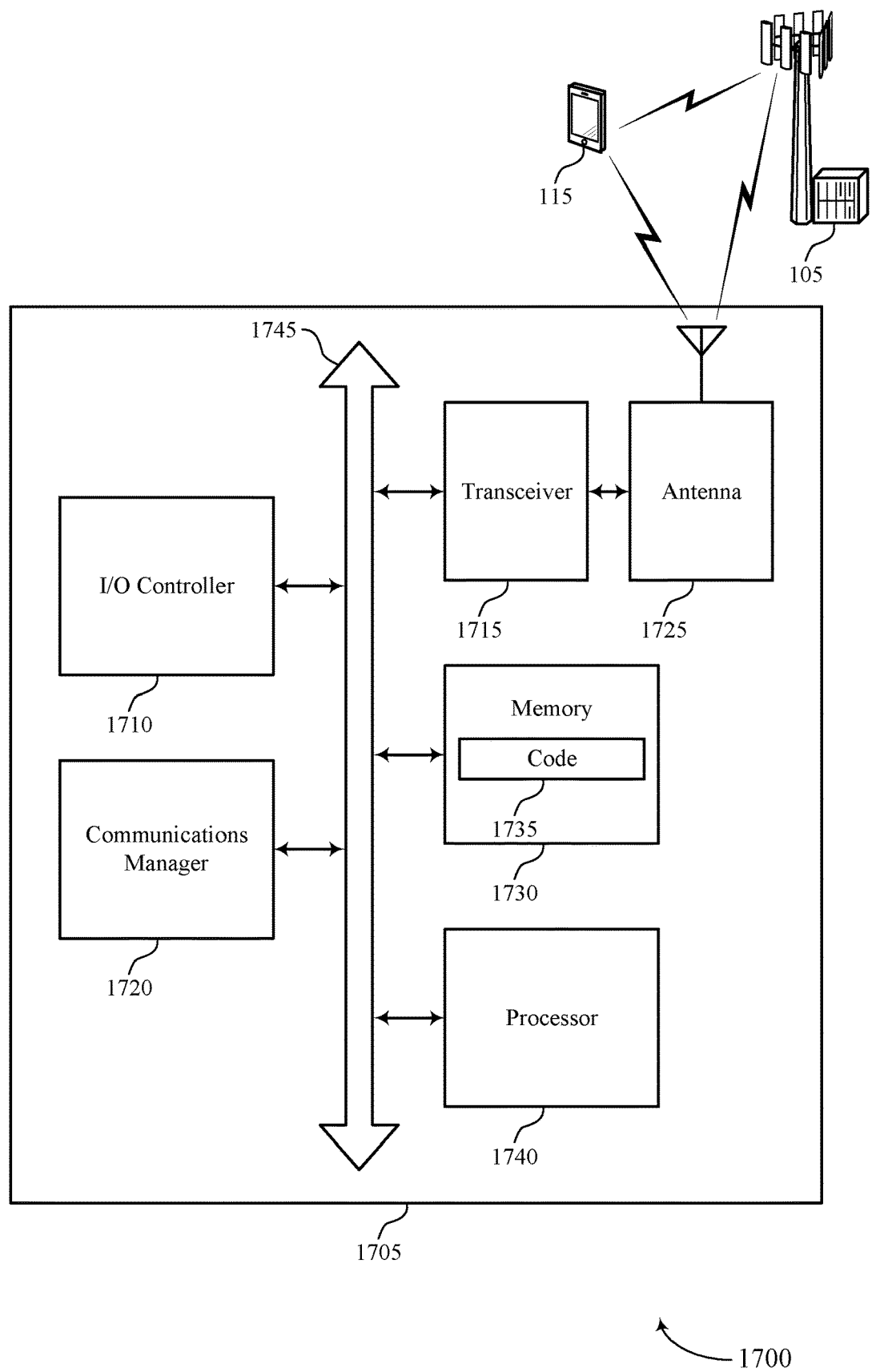
FIG. 17 illustrates a diagram of a system including a device that supports techniques for managing PAPR in accordance with one or more aspects of the present disclosure.

FIG. 17 illustrates a diagram of a system 1700 including a device 1705 that supports techniques for managing PAPR in accordance with one or more aspects of the present disclosure. The device 1705 may be an example of or include the components of a device 1405, a device 1505, or a UE 115 as described herein. The device 1705 may communicate (e.g., wirelessly) with one or more network entities 105, one or more UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting techniques for managing PAPR). For example, the device 1705 or a component of the device 1705 may include a processor 1740 and memory 1730 coupled with or to the processor 1740, the processor 1740 and memory 1730 configured to perform various functions described herein.

The communications manager 1720 may support wireless communication at a second device (e.g., the device 1705) in accordance with examples as disclosed herein. For example, the communications manager 1720 may be configured as or otherwise support a means for receiving, from a first device, a signal. The communications manager 1720 may be configured as or otherwise support a means for determining a sequence associated with the signal. The communications manager 1720 may be configured as or otherwise support a means for decoding the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence. The communications manager 1720 may be configured as or otherwise support a means for discarding the third subset of information bits based on the decoding.

By including or configuring the communications manager 1720 in accordance with examples as described herein, the device 1705 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of techniques for managing PAPR as described herein, or the processor 1740 and the memory 1730 may be otherwise configured to perform or support such operations.

Figure 18:
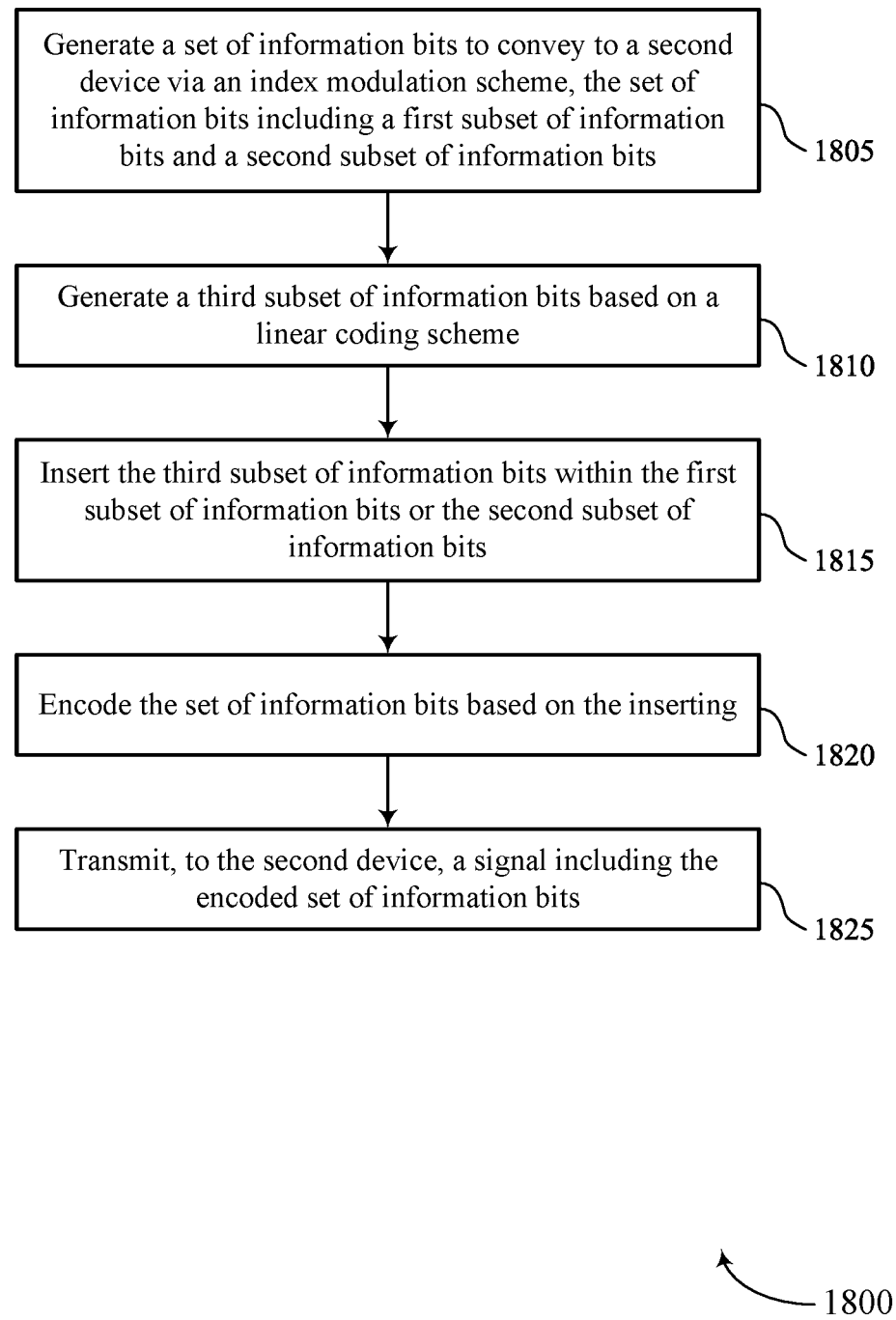
FIGS. 18 and 19 illustrate flowcharts showing methods that support techniques for managing PAPR in accordance with one or more aspects of the present disclosure.

FIG. 18 illustrates a flowchart showing a method 1800 that supports techniques for managing PAPR in accordance with one or more aspects of the present disclosure. The operations of the method 1800 may be implemented by a network node or its components as described herein. For example, the operations of the method 1800 may be performed by a network node as described with reference to FIGS. 1 through 13. In some examples, a network node may execute a set of instructions to control the functional elements of the network node to perform the described functions. Additionally, or alternatively, the network node may perform aspects of the described functions using special-purpose hardware.

At 1805, the method may include generating a set of information bits to convey to a second device via an index modulation scheme, the set of information bits including a first subset of information bits and a second subset of information bits. The operations of 1805 may be performed in accordance with examples as disclosed herein. In some examples, aspects of the operations of 1805 may be performed by an information bits manager 1225 as described with reference to FIG. 12.

At 1810, the method may include generating a third subset of information bits based on a linear coding scheme. The operations of 1810 may be performed in accordance with examples as disclosed herein. In some examples, aspects of the operations of 1810 may be performed by a third subset manager 1230 as described with reference to FIG. 12.

At 1815, the method may include inserting the third subset of information bits within the first subset of information bits or the second subset of information bits. The operations of 1815 may be performed in accordance with examples as disclosed herein. In some examples, aspects of the operations of 1815 may be performed by an insertion manager 1235 as described with reference to FIG. 12.

At 1820, the method may include encoding the set of information bits based on the inserting. The operations of 1820 may be performed in accordance with examples as disclosed herein. In some examples, aspects of the operations of 1820 may be performed by an encoder manager 1240 as described with reference to FIG. 12.

At 1825, the method may include transmitting, to the second device, a signal including the encoded set of information bits. The operations of 1825 may be performed in accordance with examples as disclosed herein. In some examples, aspects of the operations of 1825 may be performed by a signal manager 1245 as described with reference to FIG. 12.

Figure 19:
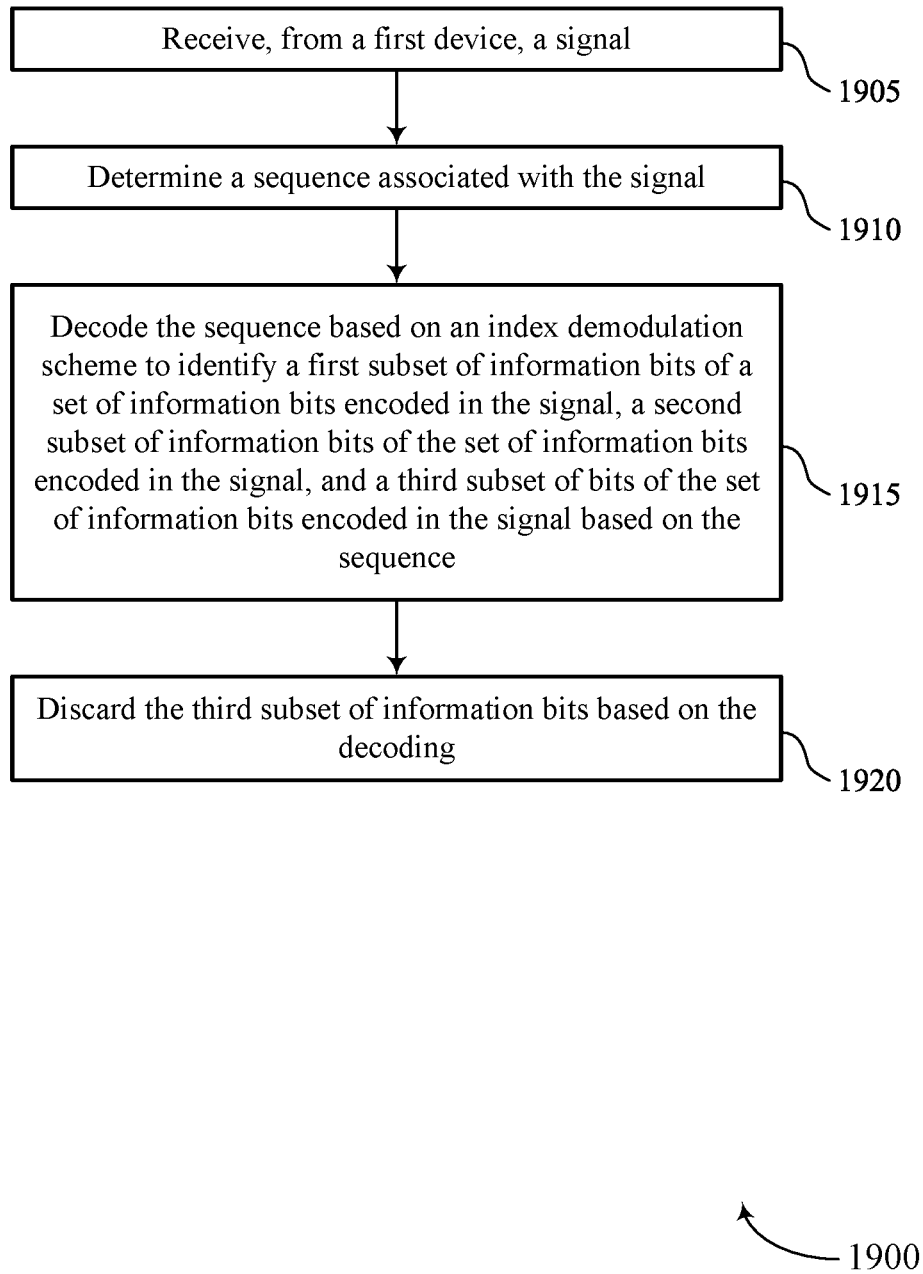

FIG. 19 illustrates a flowchart showing a method 1900 that supports techniques for managing PAPR in accordance with one or more aspects of the present disclosure. The operations of the method 1900 may be implemented by a UE or its components as described herein. For example, the operations of the method 1900 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 1905, the method may include receiving, from a first device, a signal. The operations of 1905 may be performed in accordance with examples as disclosed herein. In some examples, aspects of the operations of 1905 may be performed by a signal manager 1625 as described with reference to FIG. 16.

At 1910, the method may include determining a sequence associated with the signal. The operations of 1910 may be performed in accordance with examples as disclosed herein. In some examples, aspects of the operations of 1910 may be performed by a sequence manager 1630 as described with reference to FIG. 16.

At 1915, the method may include decoding the sequence based on an index demodulation scheme to identify a first subset of information bits of a set of information bits encoded in the signal, a second subset of information bits of the set of information bits encoded in the signal, and a third subset of bits of the set of information bits encoded in the signal based on the sequence. The operations of 1915 may be performed in accordance with examples as disclosed herein. In some examples, aspects of the operations of 1915 may be performed by a decoder manager 1635 as described with reference to FIG. 16.

At 1920, the method may include discarding the third subset of information bits based on the decoding. The operations of 1920 may be performed in accordance with examples as disclosed herein. In some examples, aspects of the operations of 1920 may be performed by a third subset manager 1640 as described with reference to FIG. 16.

The following provides an overview of aspects of the present disclosure:

Aspect 1: A method for wireless communication at a first device, comprising: generating a set of information bits to convey to a second device via an index modulation scheme, the set of information bits comprising a first subset of information bits and a second subset of information bits; generating a third subset of information bits based at least in part on a linear coding scheme; inserting the third subset of information bits within the first subset of information bits or the second subset of information bits; encoding the set of information bits based at least in part on the inserting; and transmitting, to the second device, a signal comprising the encoded set of information bits.

Aspect 2: The method of aspect 1, wherein selecting a first group of information bits and a second group of information bits from a plurality of groups of information bits, wherein the second subset of information bits comprises the first group of information bits and the second group of information bits, wherein inserting the third subset of bits comprises: inserting the third subset of information bits within the first group of information bits or the second group of information bits.

Aspect 3: The method of aspect 2, further comprising: transmitting, to the second device, an indication of the first group of information bits, including the third subset of information bits or the second group of information bits including the third subset of information bits, based at least in part on the inserting.

Aspect 4: The method of any of aspects 2 through 3, wherein inserting the third subset of information bits within the first group of information bits or the second group of information bits comprises: inserting the third subset of information bits within the first group of information bits or the second group of information bits based at least on a peak-to-average power associated with the encoded set of information bits.

Aspect 5: The method of any of aspects 1 through 4, further comprising: determining a quantity of groups of information bits based at least on a quantity of information bits of the third subset of information bits, wherein inserting the third subset of information bits comprises inserting the third subset of information bits within at least one of the quantity of groups of information bits.

Aspect 6: The method of aspect 5, further comprising: transmitting, to the second device, an indication of the at least one of the quantity of groups of information bits including the third subset of information bits.

Aspect 7: The method of any of aspects 5 through 6, wherein inserting the third subset of information bits within the at least one of the quantity of groups of information bits comprises: inserting the third subset of information bits within the at least one of the quantity of groups of information bits based at least on a peak-to-average power associated with the encoded set of information bits.

Aspect 8: The method of any of aspects 1 through 7, wherein inserting the third subset of information bits comprises: inserting the third subset of information bits within at least one group of a plurality of groups of information bits; and inserting a set of forced bits within the first subset of information bits for indicating one or more locations of the third subset of information bits.

Aspect 9: The method of aspect 8, further comprising: transmitting, to the second device, an indication of the set of forced bits.

Aspect 10: The method of any of aspects 1 through 9, further comprising: interleaving the first subset of information bits using a first interleaving scheme to generate a first interleaved subset of information bits; interleaving the first subset of information bits using a second interleaving scheme to generate a second interleaved first subset of information bits; and selecting the first interleaved first subset of information bits or the second interleaved first subset of information bits based at least on a peak-to-average power associated with the encoded set of information bits, wherein encoding the set of information bits is based at least in part on the selecting.

Aspect 11: The method of any of aspects 1 through 10, wherein the index modulation scheme comprises a MM-OFDM-IM scheme.

Aspect 12: The method of any of aspects 1 through 11, wherein the third subset of information bits comprises one or more bits of the first subset of information bits or the second subset of information bits.

Aspect 13: The method of any of aspects 1 through 12, wherein the signal comprises a MM-OFDM-IM scheme waveform.

Aspect 14: The method of any of aspects 1 through 13, wherein the first device comprises a UE and the second device comprises a network node.

Aspect 15: The method of any of aspects 1 through 13, wherein the first device comprises a network node and the second device comprises a UE.

Aspect 16: The method of any of aspects 1 through 13, wherein the first device comprises a first UE and the second device comprises a second UE.

Aspect 17: A method for wireless communication at a second device, comprising: receiving, from a first device, a signal; determining a sequence associated with the signal; decoding the sequence based at least in part on an index demodulation scheme to identify a first subset of information bits of a set of information bits encoded in the signal, a second subset of information bits of the set of information bits encoded in the signal, and a third subset of bits of the set of information bits encoded in the signal based at least in part on the sequence; and discarding the third subset of information bits based at least in part on the decoding.

Aspect 18: The method of aspect 17, wherein decoding the sequence comprises: identifying a first group of information bits of the second subset of information bits and a second group of information bits of the second subset of information bits.

Aspect 19: The method of aspect 18, further comprising: receiving, from the first device, an indication of the first group of information bits including the third subset of information bits or the second group of information bits including the third subset of information bits; and identifying the third subset of information bits based at least in part on the indication.

Aspect 20: The method of any of aspects 17 through 19, wherein decoding the sequence comprises: identifying a quantity of groups of information bits of the second subset of information bits.

Aspect 21: The method of aspect 20, further comprising: receiving, from the first device, an indication of a group of the quantity of groups of information bits including the third subset of information bits; and identifying the third subset of information bits based at least in part on the indication.

Aspect 22: The method of any of aspects 17 through 21, further comprising: receiving, from the first device, an indication of a set of forced bits within the first subset of information bits; and identifying the third subset of information bits based at least in part on the indication.

Aspect 23: The method of any of aspects 17 through 22, wherein the signal comprises a MM-OFDM-IM scheme waveform.

Aspect 24: The method of any of aspects 17 through 23, wherein the index demodulation scheme comprises a MM-OFDM-IM scheme.

Aspect 25: The method of any of aspects 17 through 24, wherein the first device comprises a UE and the second device comprises a network node.

Aspect 26: The method of any of aspects 17 through 24, wherein the first device comprises a network node and the second device comprises a UE.

Aspect 27: The method of any of aspects 17 through 24, wherein the first device comprises a first UE and the second device comprises a second UE.

Aspect 28: An apparatus for wireless communication at a first device, comprising a processor; memory coupled with the processor; and instructions stored in the memory and executable by the processor to cause the apparatus to perform a method of any of aspects 1 through 16.

Aspect 29: An apparatus for wireless communication at a first device, comprising at least one means for performing a method of any of aspects 1 through 16.

Aspect 30: A non-transitory computer-readable medium storing code for wireless communication at a first device, the code comprising instructions executable by a processor to perform a method of any of aspects 1 through 16.

Aspect 31: An apparatus for wireless communication at a second device, comprising a processor; memory coupled with the processor; and instructions stored in the memory and executable by the processor to cause the apparatus to perform a method of any of aspects 17 through 27.

Aspect 32: An apparatus for wireless communication at a second device, comprising at least one means for performing a method of any of aspects 17 through 27.

Aspect 33: A non-transitory computer-readable medium storing code for wireless communication at a second device, the code comprising instructions executable by a processor to perform a method of any of aspects 17 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
   a processor;
   memory coupled with the processor; and
   instructions stored in the memory and executable by the processor to cause the apparatus to:
   generate a set of information bits to convey to a second device via an index modulation scheme, the set of information bits comprising a first subset of information bits and a second subset of information bits;
   generate a third subset of information bits based at least in part on a linear coding scheme;
   insert the third subset of information bits within the first subset of information bits or the second subset of information bits;
   encode the set of information bits based at least in part on the inserting; and
   transmit, to the second device, a signal comprising the encoded set of information bits.

2. The apparatus of claim 1, wherein the instructions are further executable by the processor to cause the apparatus to:
   select a first group of information bits and a second group of information bits from a plurality of groups of information bits, wherein the second subset of information bits comprises the first group of information bits and the second group of information bits,
   wherein the instructions to insert the third subset of bits are executable by the processor to cause the apparatus to:
   insert the third subset of information bits within the first group of information bits or the second group of information bits.

3. The apparatus of claim 2, wherein the instructions are further executable by the processor to cause the apparatus to:
   transmit, to the second device, an indication of the first group of information bits, including the third subset of information bits or the second group of information bits including the third subset of information bits, based at least in part on the inserting.

4. The apparatus of claim 2, wherein the instructions to insert the third subset of information bits within the first group of information bits or the second group of information bits are executable by the processor to cause the apparatus to:
   insert the third subset of information bits within the first group of information bits or the second group of information bits based at least on a peak-to-average power ratio associated with the encoded set of information bits.

5. The apparatus of claim 1, wherein the instructions are further executable by the processor to cause the apparatus to:
   determine a quantity of groups of information bits based at least on a quantity of information bits of the third subset of information bits,
   wherein the instructions to insert the third subset of information bits are executable by the processor to cause the apparatus to:
   insert the third subset of information bits within at least one of the quantity of groups of information bits.

6. The apparatus of claim 5, wherein the instructions are further executable by the processor to cause the apparatus to:
   transmit, to the second device, an indication of the at least one of the quantity of groups of information bits including the third subset of information bits.

7. The apparatus of claim 5, wherein the instructions to insert the third subset of information bits within the at least one of the quantity of groups of information bits are executable by the processor to cause the apparatus to:
   insert the third subset of information bits within the at least one of the quantity of groups of information bits based at least on a peak-to-average power ratio associated with the encoded set of information bits.

8. The apparatus of claim 1, wherein the instructions to insert the third subset of information bits are executable by the processor to cause the apparatus to:
 insert the third subset of information bits within at least one group of a plurality of groups of information bits; and
 insert a set of forced bits within the first subset of information bits for indicating one or more locations of the third subset of information bits.

9. The apparatus of claim 8, wherein the instructions are further executable by the processor to cause the apparatus to:
 transmit, to the second device, an indication of the set of forced bits.

10. The apparatus of claim 1, wherein the instructions are further executable by the processor to cause the apparatus to:
 interleave the first subset of information bits using a first interleaving scheme to generate a first interleaved subset of information bits;
 interleave the first subset of information bits using a second interleaving scheme to generate a second interleaved first subset of information bits; and
 select the first interleaved first subset of information bits or the second interleaved first subset of information bits based at least on a peak-to-average power ratio associated with the encoded set of information bits,
 wherein encode the set of information bits is based at least in part on the selecting.

11. The apparatus of claim 1, wherein the index modulation scheme comprises a multi-mode orthogonal frequency divisional multiplexing index modulation scheme.

12. The apparatus of claim 1, wherein the third subset of information bits comprises one or more bits of the first subset of information bits or the second subset of information bits.

13. The apparatus of claim 1, wherein the signal comprises a multi-mode orthogonal frequency divisional multiplexing index modulation scheme waveform.

14. The apparatus of claim 1, wherein:
 the first device comprises a user equipment; and
 the second device comprises a network node.

15. The apparatus of claim 1, wherein:
 the first device comprises a network node; and
 the second device comprises a user equipment.

16. The apparatus of claim 1, wherein:
 the first device comprises a first user equipment; and
 the second device comprises a second user equipment.

17. An apparatus for wireless communication at a second device, comprising:
 a processor;
 memory coupled with the processor; and
 instructions stored in the memory and executable by the processor to cause the apparatus to:
  receive, from a first device, a signal;
  determine a sequence associated with the signal;
  decode the sequence based at least in part on an index demodulation scheme to identify a first subset of information bits of a set of information bits encoded in the signal, a second subset of information bits of the set of information bits encoded in the signal, and a third subset of bits of the set of information bits encoded in the signal based at least in part on the sequence; and
  discard the third subset of information bits based at least in part on the decoding.

18. The apparatus of claim 17, wherein the instructions to decode the sequence are executable by the processor to cause the apparatus to:
 identify a first group of information bits of the second subset of information bits and a second group of information bits of the second subset of information bits.

19. The apparatus of claim 18, wherein the instructions are further executable by the processor to cause the apparatus to:
 receive, from the first device, an indication of the first group of information bits including the third subset of information bits or the second group of information bits including the third subset of information bits; and
 identify the third subset of information bits based at least in part on the indication.

20. The apparatus of claim 17, wherein the instructions to decode the sequence are executable by the processor to cause the apparatus to:
 identify a quantity of groups of information bits of the second subset of information bits.

21. The apparatus of claim 20, wherein the instructions are further executable by the processor to cause the apparatus to:
 receive, from the first device, an indication of a group of the quantity of groups of information bits including the third subset of information bits; and
 identify the third subset of information bits based at least in part on the indication.

22. The apparatus of claim 17, wherein the instructions are further executable by the processor to cause the apparatus to:
 receive, from the first device, an indication of a set of forced bits within the first subset of information bits; and
 identify the third subset of information bits based at least in part on the indication.

23. The apparatus of claim 17, wherein the signal comprises a multi-mode orthogonal frequency divisional multiplexing index modulation scheme waveform.

24. The apparatus of claim 17, wherein the index demodulation scheme comprises a multi-mode orthogonal frequency divisional multiplexing index modulation scheme.

25. The apparatus of claim 17, wherein:
 the first device comprises a user equipment; and
 the second device comprises a network node.

26. The apparatus of claim 17, wherein:
 the first device comprises a network node; and
 the second device comprises a user equipment.

27. The apparatus of claim 17, wherein:
 the first device comprises a first user equipment; and
 the second device comprises a second user equipment.

28. A method for wireless communication at a first device, comprising:
 generating a set of information bits to convey to a second device via an index modulation scheme, the set of information bits comprising a first subset of information bits and a second subset of information bits;
 generating a third subset of information bits based at least in part on a linear coding scheme;
 inserting the third subset of information bits within the first subset of information bits or the second subset of information bits;
 encoding the set of information bits based at least in part on the inserting; and
 transmitting, to the second device, a signal comprising the encoded set of information bits.

29. The method of claim 28, further comprising:
 selecting a first group of information bits and a second group of information bits from a plurality of groups of information bits, wherein the second subset of information bits comprises the first group of information bits and the second group of information bits, wherein inserting the third subset of bits comprises:
inserting the third subset of information bits within the first group of information bits or the second group of information bits.

30. A method for wireless communication at a second device, comprising:

receiving, from a first device, a signal;

determining a sequence associated with the signal;

decoding the sequence based at least in part on an index demodulation scheme to identify a first subset of information bits of a set of information bits encoded in the signal, a second subset of information bits of the set of information bits encoded in the signal, and a third subset of bits of the set of information bits encoded in the signal based at least in part on the sequence; and discarding the third subset of information bits based at least in part on the decoding.

* * * * *